(12) United States Patent
Yokota

(10) Patent No.: US 7,690,550 B2
(45) Date of Patent: Apr. 6, 2010

(54) REFLOW SOLDERING APPARATUS

(75) Inventor: Yatsuharu Yokota, Hachioji (JP)

(73) Assignee: Yokota Technica Limited Company, Hachioji-shi, Tokyo (JP)

( * ) Notice: Subject to any disclaimer, the term of this patent is extended or adjusted under 35 U.S.C. 154(b) by 419 days.

(21) Appl. No.: 10/511,450

(22) PCT Filed: May 1, 2003

(86) PCT No.: PCT/JP03/05589

§ 371 (c)(1),
(2), (4) Date: Oct. 27, 2004

(87) PCT Pub. No.: WO03/098982

PCT Pub. Date: Nov. 27, 2003

(65) Prior Publication Data

US 2005/0178814 A1    Aug. 18, 2005

(30) Foreign Application Priority Data

| May 16, 2002 | (JP) | 2002-141237 |
| Oct. 1, 2002 | (JP) | 2002-288548 |
| Apr. 15, 2003 | (JP) | 2003-109942 |
| Apr. 15, 2003 | (JP) | 2003-110130 |

(51) Int. Cl.
*B23K 1/00* (2006.01)

(52) U.S. Cl. .............. 228/43; 228/180.1; 228/246; 228/245; 228/42; 219/388; 219/478

(58) Field of Classification Search .............. 228/43, 228/19, 180.1, 246, 42, 245; 55/385.5, 442, 55/428.1, 428; 219/388, 478
See application file for complete search history.

(56) References Cited

U.S. PATENT DOCUMENTS

| 4,674,475 A | * | 6/1987 | Powis ............... 126/110 C |
| 4,770,293 A | * | 9/1988 | Craig .................. 206/564 |
| 5,069,380 A | * | 12/1991 | Deambrosio ........... 228/42 |
| 5,154,338 A | * | 10/1992 | Okuno et al. ........... 228/42 |
| 5,579,981 A | * | 12/1996 | Matsumura et al. ...... 228/19 |

FOREIGN PATENT DOCUMENTS

| JP | 63-186543 | | 8/1988 |
| JP | 64-83395 | | 3/1989 |
| JP | 3-218093 | | 9/1991 |
| JP | 06-182986 | | 7/1994 |
| JP | 07-015120 | * | 1/1995 |

(Continued)

OTHER PUBLICATIONS

Japanese Office Action dated Feb. 26, 2008.

*Primary Examiner*—Jessica L. Ward
*Assistant Examiner*—Michael Aboagye
(74) *Attorney, Agent, or Firm*—Kratz, Quintos & Hanson, LLP

(57) ABSTRACT

In a reflow soldering apparatus comprising a conveyor 4 to transport circuit boards 5 mounted with electronic components into multiple chambers 1, 2 and 3, and fans 6 installed in the chambers 1, 2 and 3, the centers of the impellers in the adjacent fans 6 are not on a single perpendicular plane along the transport line of the conveyor and arrayed offset to the left and right. This apparatus may also employ a structure wherein the centers of the impellers in the adjacent fans are not on a single horizontal plane and arrayed offset up and down. Further, it may also employ a structure wherein the fans are arranged with their rotation shafts inclined.

4 Claims, 23 Drawing Sheets

FOREIGN PATENT DOCUMENTS

| | | | |
|---|---|---|---|
| JP | 7-15120 | | 1/1995 |
| JP | 07-142855 | * | 6/1995 |
| JP | 7-142855 | | 6/1995 |
| JP | 11-186707 | * | 7/1999 |
| JP | 2002-134905 | | 5/2002 |
| TW | 483355 | | 4/2002 |

* cited by examiner

REFLOW SOLDERING APPARATUS

TECHNICAL FIELD

The present invention relates to a reflow soldering apparatus installed with a conveyor to transport circuit boards mounted with electronic components into multiple chambers, blowing means and heaters.

BACKGROUND ART

A reflow soldering apparatus solders electronic components on a circuit board while transporting the circuit board on a conveyor through a heating chamber where soldering paste is heated and melted and a cooling chamber where the melted solder is cooled.

The reflow soldering apparatus is installed with a fan and a heater to perform reflow soldering of the electronic components using heated gas. A reflow soldering apparatus of this type generally has multiple preheating chambers and reflow chambers in sequence along the transport line of the conveyor. A fan and a heater are installed in each preheating chamber and reflow chamber. The fan and heater are arranged above and below the conveyor. Gas heated while passing through a heater is guided by a blow guidance means installed in each chamber and blown out from many nozzle holes to heat and melt the soldering paste on the printed circuit board mounted with electronic components on the conveyor.

In this reflow soldering apparatus, the fan has a vertical rotating shaft and is installed in the center of each chamber. The fans are arranged in a straight line along the transport line of the conveyor (see for example Japanese Patent Publication No. 2002-134905).

When the size of the fan is enlarged to increase the fan power, the problem occurs that the total length of the reflow soldering apparatus is increased by an increasing amount of the fan size, since these fans are installed in a straight line along the transport line of the conveyor.

In view of the above problems, the present invention has the object of providing a reflow soldering apparatus capable of employing a blowing means with a larger size without increasing the total length of the apparatus.

DISCLOSURE OF INVENTION

In the present invention, a reflow soldering apparatus comprising a conveyor to transport circuit boards mounted with electronic components into multiple chambers, and blowing means installed in the chambers is characterized in that the centers of the impellers in the adjacent blowing means are not on a single perpendicular plane along the transport line of the conveyor and arrayed offset to the left and right.

The blowing means may for example be arranged left and right in a zigzag pattern along the transport line of the conveyor.

The present invention may be comprised as follows. A reflow soldering apparatus comprising a conveyor to transport circuit boards mounted with electronic components into multiple chambers, and blowing means installed in the chambers is characterized in that the centers of the impellers in the adjacent blowing means are not on a single horizontal plane and arrayed offset up and down.

The blowing means may for example be arranged above and below in a zigzag pattern along the transport line of the conveyor.

The present invention may be further comprised as follows. A reflow soldering apparatus comprising a conveyor to transport circuit boards mounted with electronic components into multiple chambers, and blowing means installed in the chambers is characterized in that the blowing means are arranged with their rotating shafts inclined in the chambers.

In the reflow soldering apparatus having blowing means above and below the conveyor, the rotating shafts of the upper and lower blowing means may be arranged diagonally in different directions, or may be arranged diagonally in the same direction.

The present invention as described above, allows installing a blowing means with a larger size or in other words greater power without increasing the total length of the reflow soldering apparatus. A reflow soldering apparatus with both superior performance and a compact design can therefore be provided.

BEST MODE FOR CARRYING OUT THE INVENTION

A preferred embodiment of the present invention is described next while referring to the accompanying drawings FIG. 1 through FIG. 7.

Figure 1:
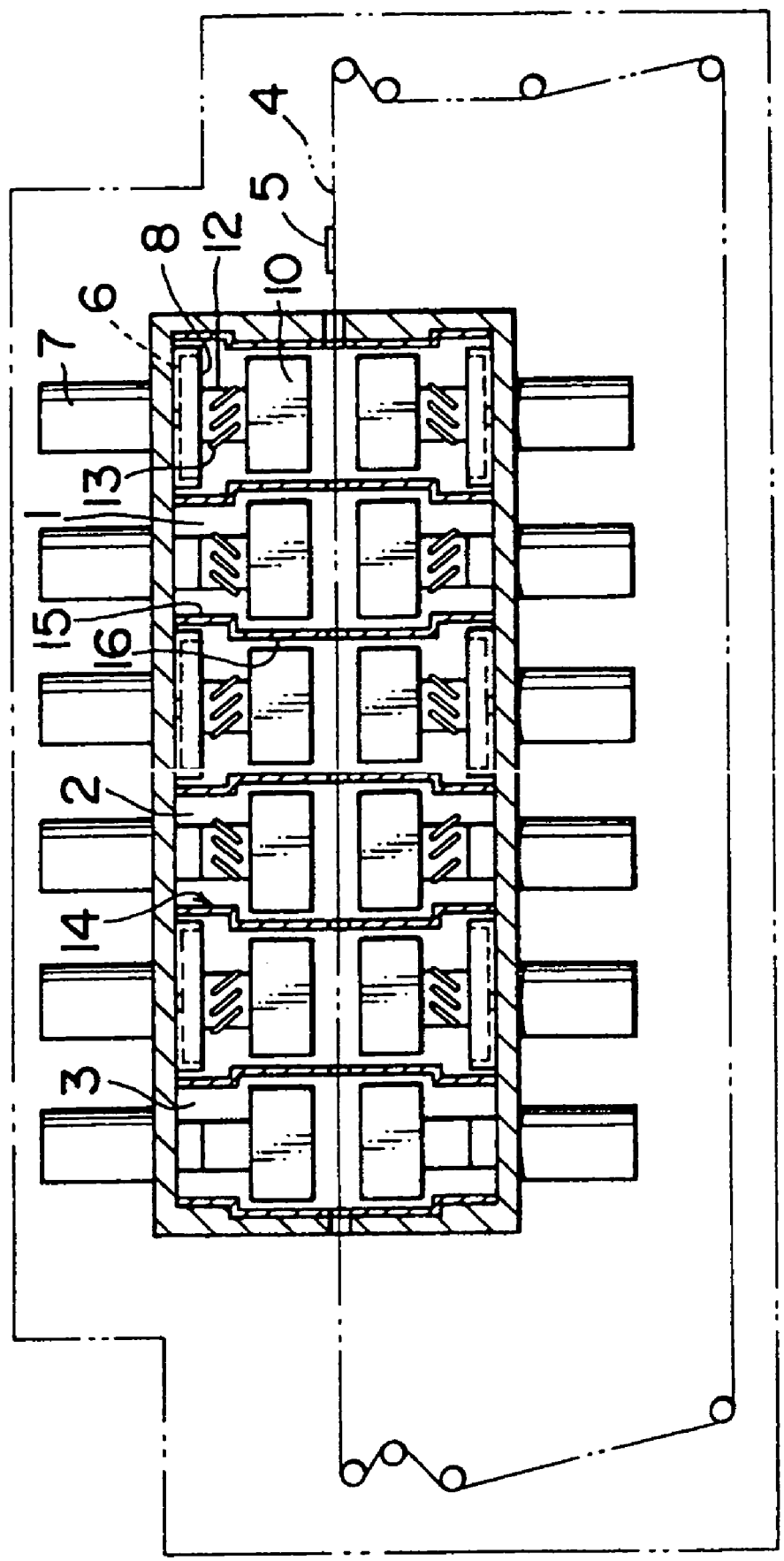
FIG. 1 is a vertical cross sectional view showing a preferred embodiment of the reflow soldering apparatus of the present invention.

A reflow soldering apparatus as shown in FIG. 1, is comprised of three preheating chambers 1, two reflow chambers 2, and one cooling chamber 3 which are arrayed in sequence along the transport line of a conveyor 4. Nitrogen gas is supplied into each of the chambers 1, 2 and 3 to prevent oxidation of the solder. A printed circuit board 5 mounted with electronic components is transported in sequence into each of the chambers 1, 2 and 3 by the conveyor 4. After the printed circuit board 5 mounted with electronic components is heated at a predetermined temperature in the preheating chamber 1, the soldering paste is melted in the reflow chamber 2, the melted solder then cooled in the cooling chamber 3, and the electronic components soldered onto the printed circuit board. Nitrogen gas is used in this embodiment to provide the gaseous atmosphere within each of the chambers 1, 2 and 3, however air may be used as the atmospheric gas.

The conveyor 4 makes a transport line arranged horizontally in a forward path in approximately the vertical center of each of the chambers 1, 2 and 3 from the entrance of the preheating chamber 1 to the exit of the cooling chamber 3 and in a return path arranged at the lower outer side of the chambers 1, 2 and 3 forming an endless chain conveyor.

Heated gas circulating systems of the same structure are provided above and below the conveyor 4 in the preheating chamber 1 and the reflow chamber 2. The system on the upper side is described here, however the system on the lower side has an identical structure.

Figure 2:
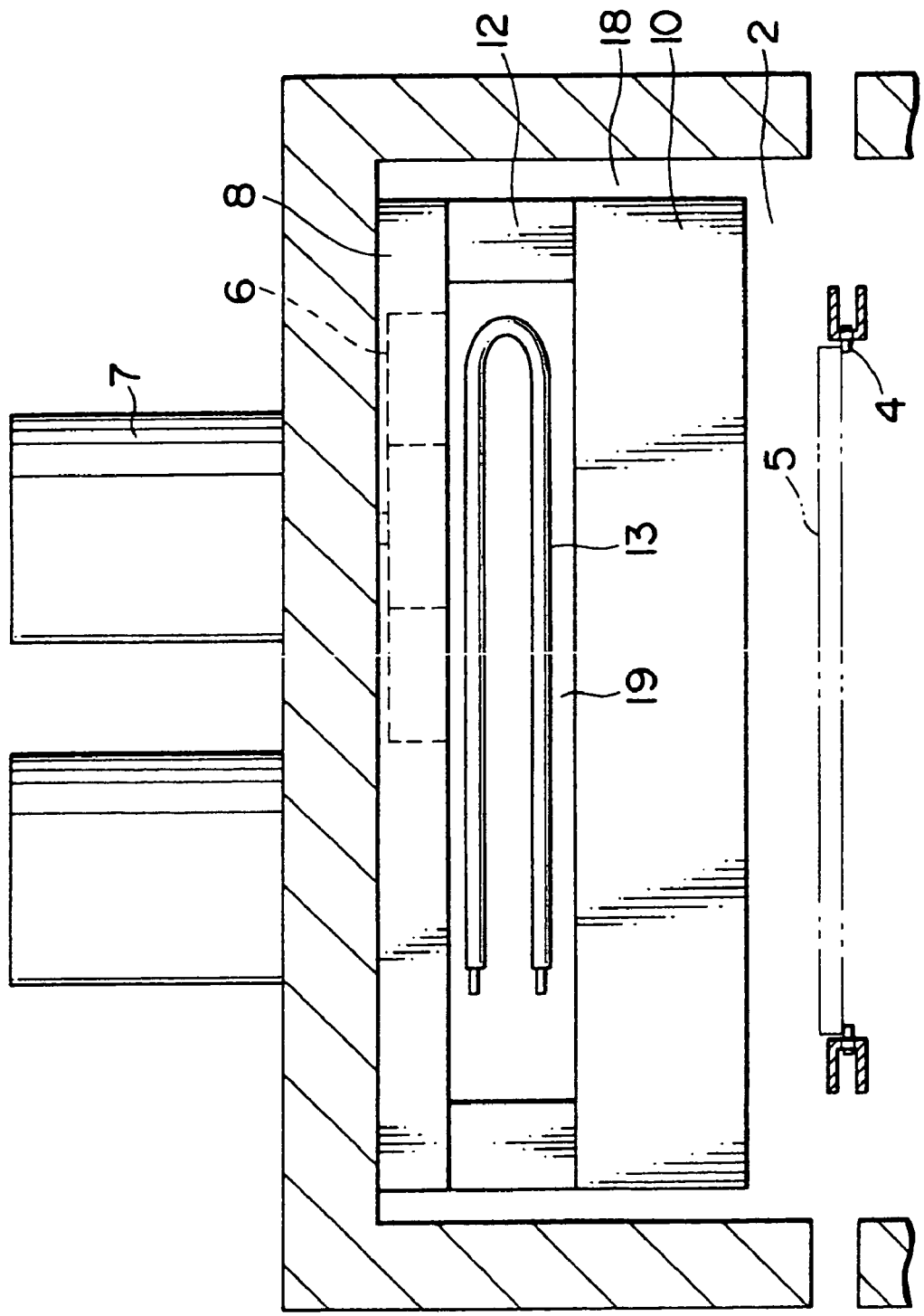
FIG. 2 is a vertical cross sectional view of a portion of the reflow soldering apparatus cut at a right angle to the transport line of the conveyor.
Figure 3:
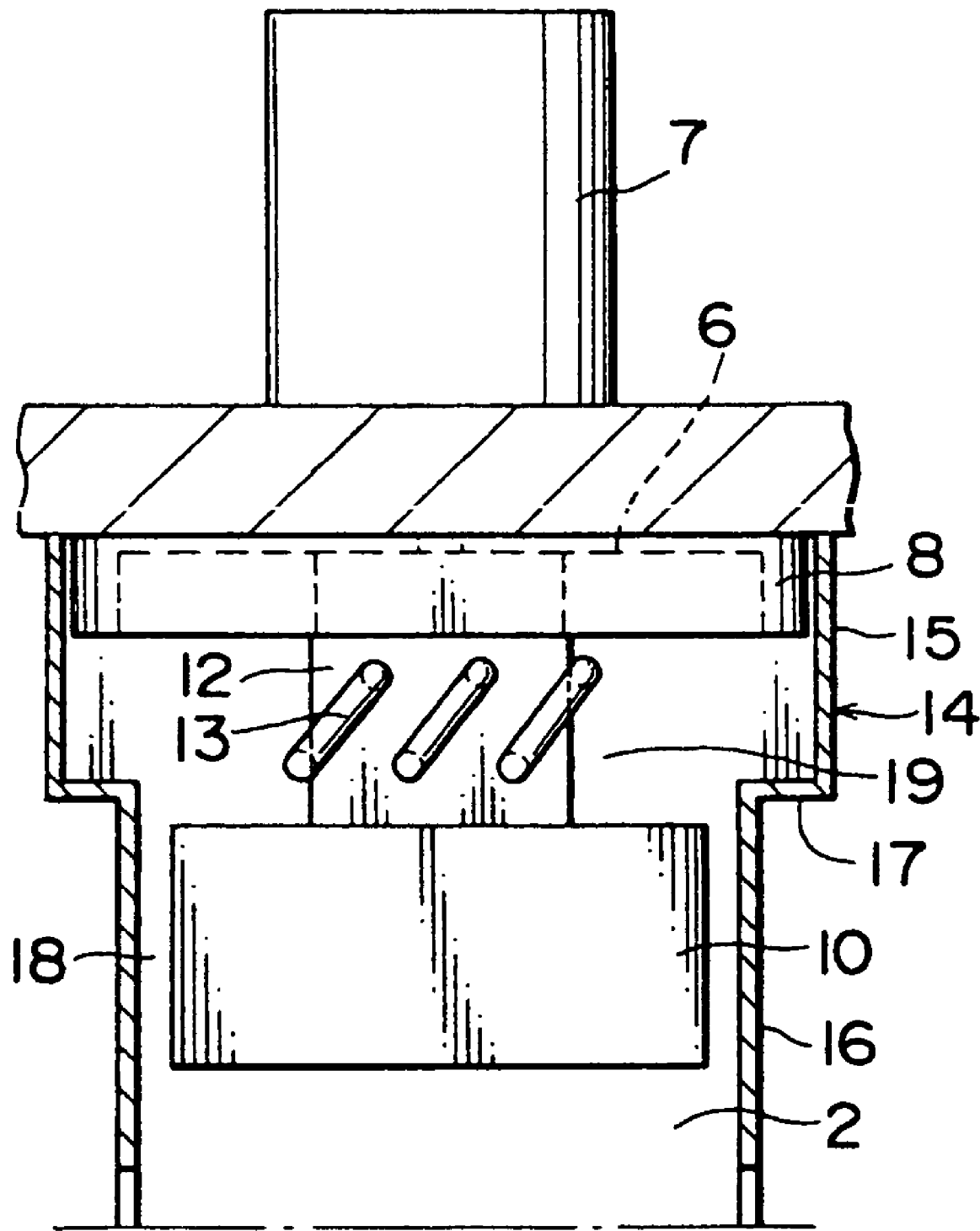
FIG. 3 is an enlarged view of a portion of FIG. 1.
Figure 4:
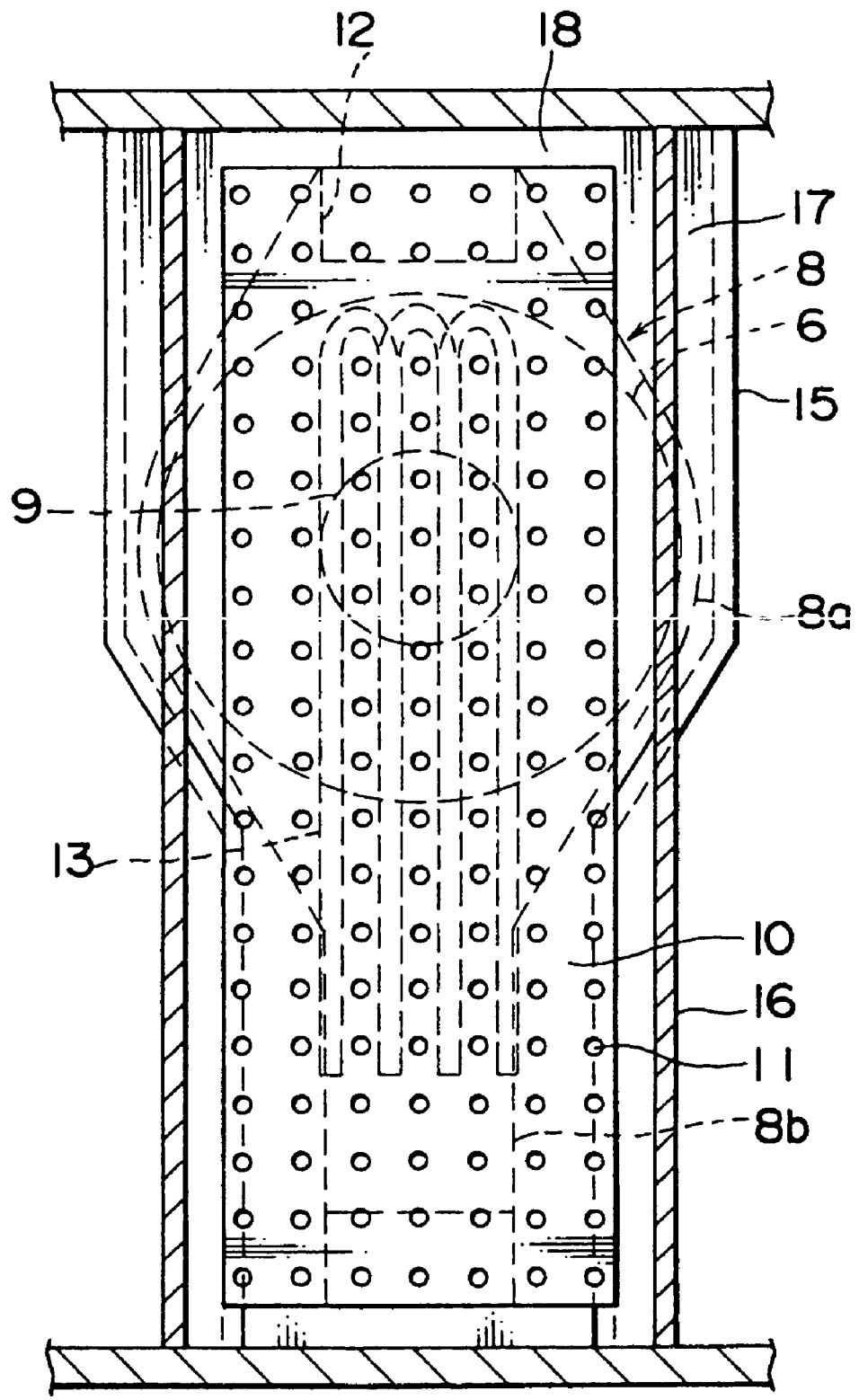
FIG. 4 is a horizontal cross sectional view of a portion of the reflow soldering apparatus as seen from the conveyor side.
Figure 5:
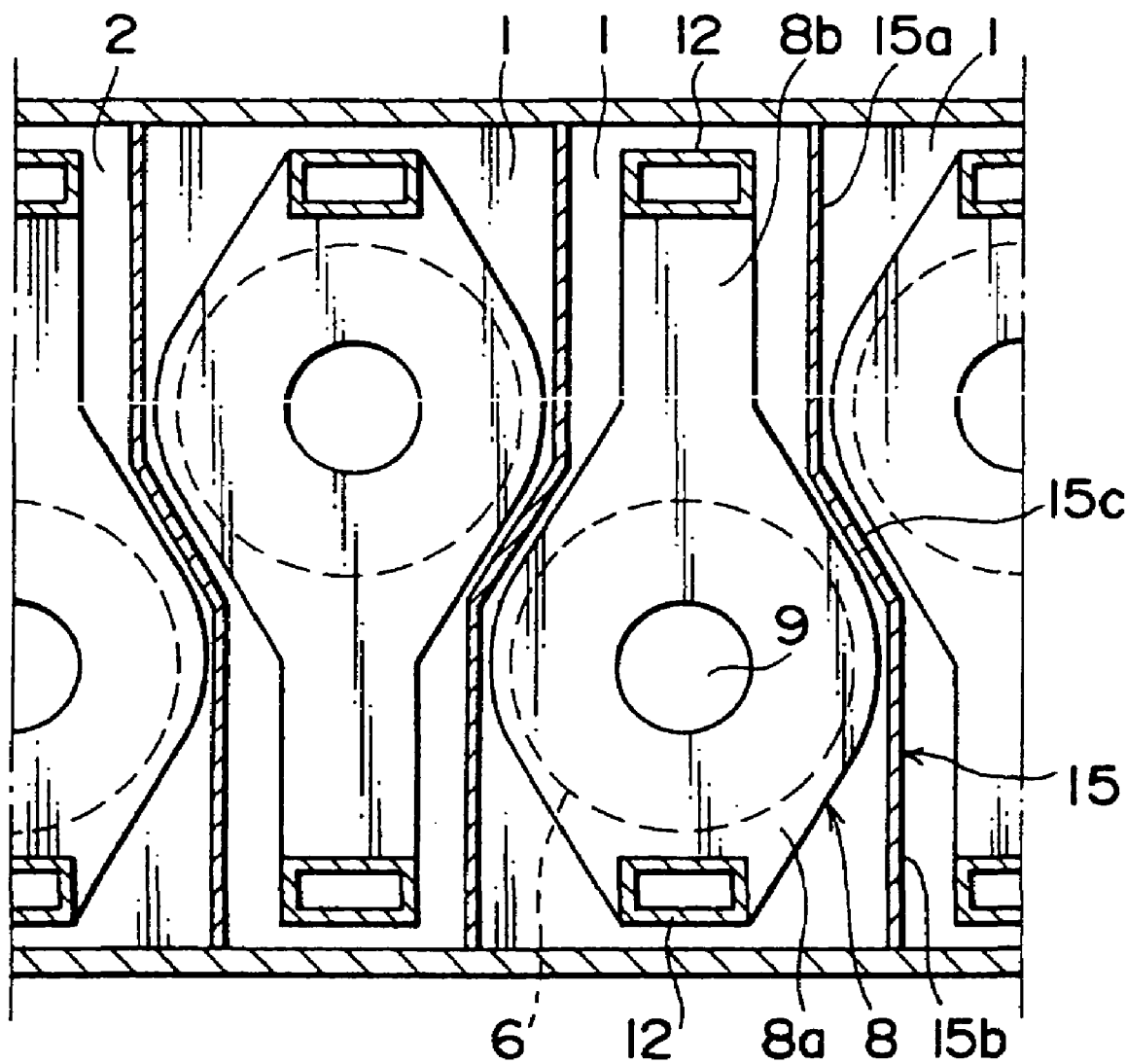
FIG. 5 is a horizontal cross sectional view of a portion of the reflow soldering apparatus cut at the first wall.
Figure 6:
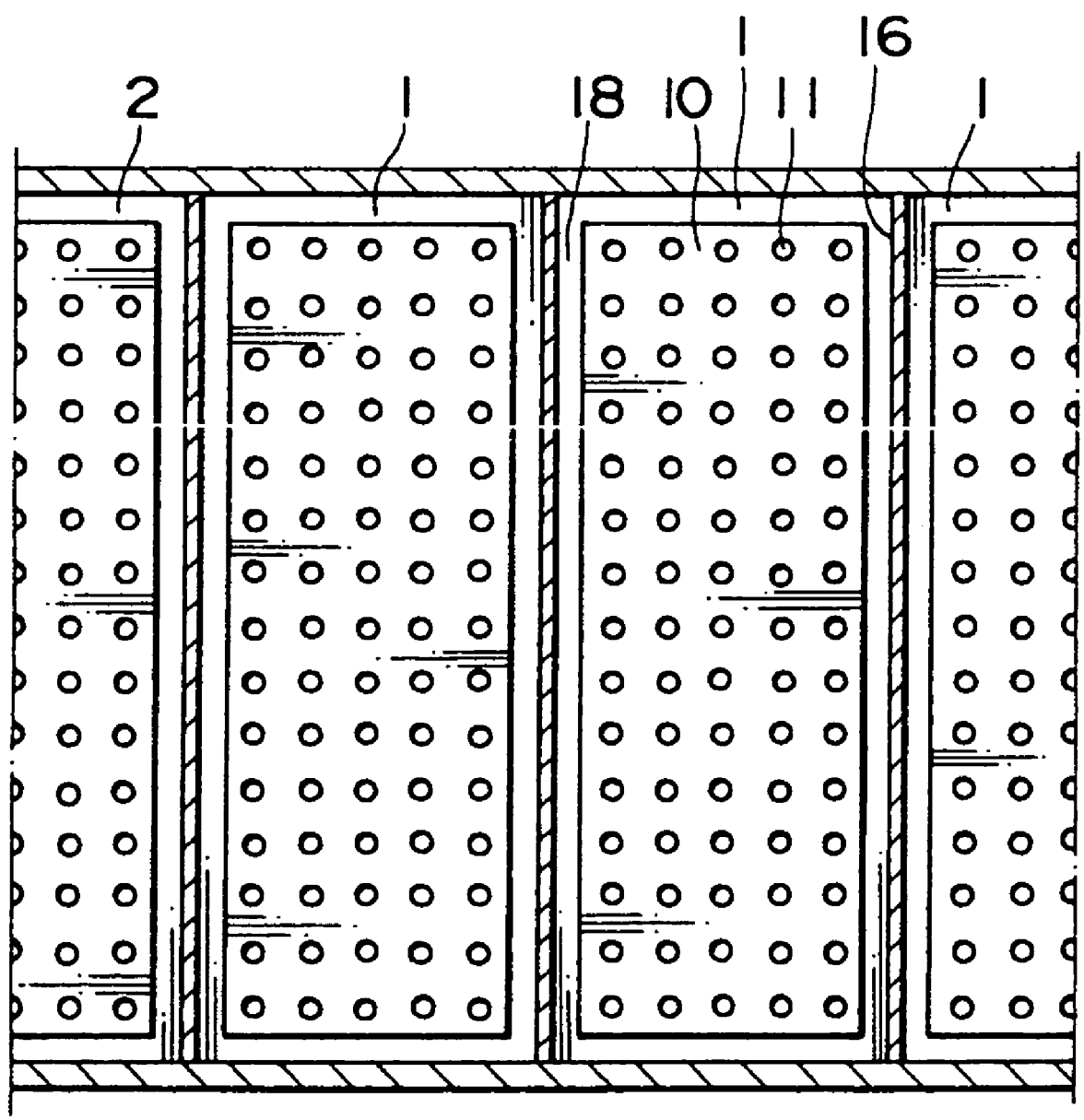
FIG. 6 is a horizontal cross sectional view of a portion of the reflow soldering apparatus cut at the second wall.
Figure 7:
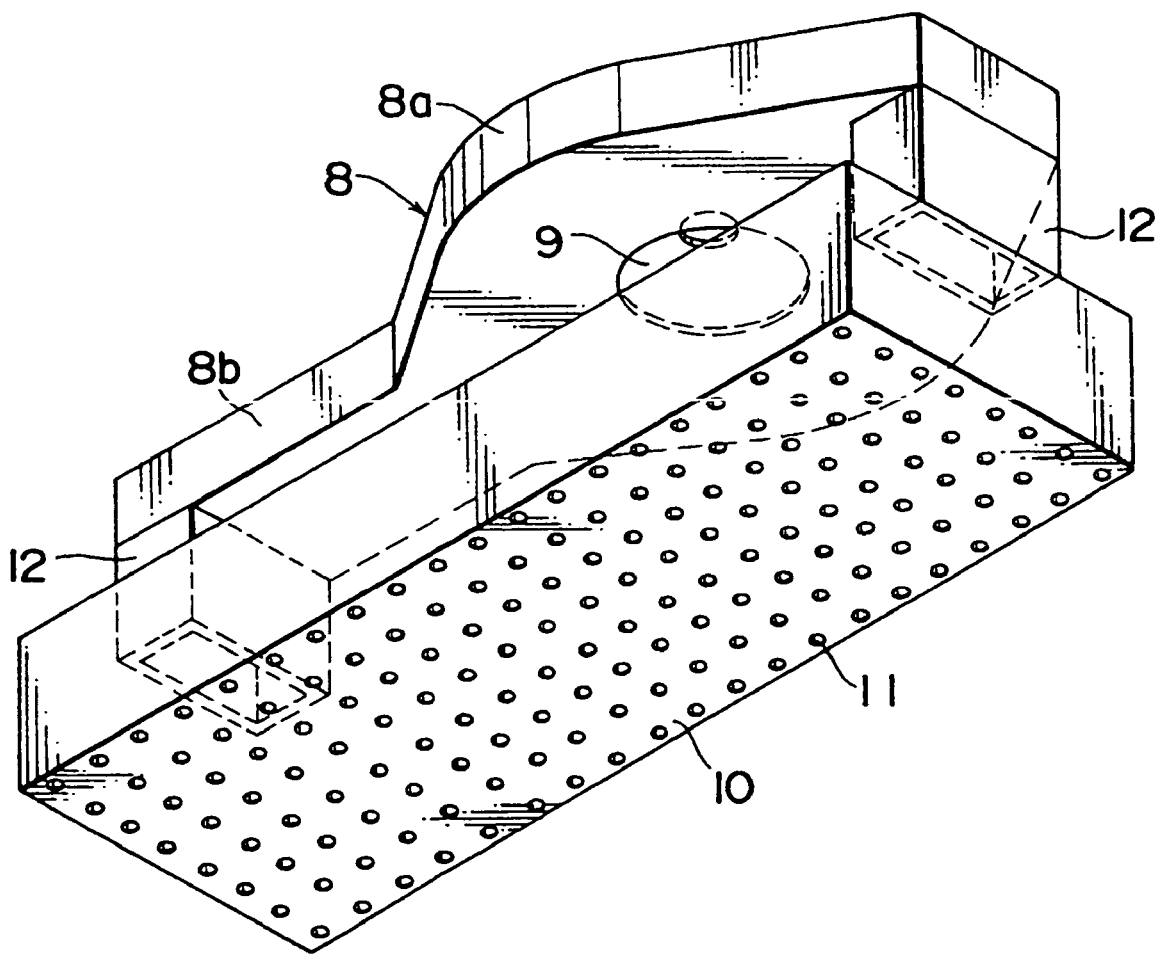
FIG. 7 is a perspective view showing a first and second casing member connected by a duct.

Fans 6 are installed respectively at the upper edge within the chambers 1 and 2 as shown in FIG. 1 through FIG. 3. Each of the fans 6 has a vertical rotating shaft 6a and connects to a respective motor 7 installed on the upper external side of each of the chambers 1 and 2. The fans 6 are multiblade fans or turbo fans, etc. The fan 6 has an intake opening in the center on the bottom side and a discharge opening on the external circumference, and is housed within a first casing member 8.

The first casing member 8 (see FIG. 1 through FIG. 5 and FIG. 7) is comprised of a fan storage section 8a and a gas guide section 8b. The fan storage section 8a houses the fan 6 and has an intake opening 9 on the lower surface facing the intake opening of the fan 6. The gas guide section 8b extends to a fixed length in one direction from the fan storage section 8a and has a width smaller than the diameter of the fan 6.

A second casing member 10 (see FIG. 1 through FIG. 4, FIG. 6 and FIG. 7) is installed between the first casing member 8 and the conveyor 4. The second casing member 10 is a rectangular case member as seen from a plan view and has a large number of heated gas nozzle holes 11 on the side facing the conveyor 4. The width of the second casing member 10 in the transport line of the conveyor 4 is larger than the width of the gas guide section 8b of the first casing member 8 and is smaller than the diameter of the fan 6.

In the first casing member 8, the end of the gas guide section 8b, and the end on the opposite side from the gas guide section 8b of the fan storage section 8a are connected to both ends of the second casing member 10 by a duct 12.

The first casing member 8 and the second casing member 10 connected by the duct 12 are installed in each of the chambers 1 and 2. In this case, the fans 6 are installed with their impeller centers arrayed offset left and right from the center within the chambers 1 and 2 in a direction perpendicular to the transport line of the conveyor 4. The first casing member 8 is arranged with the gas guide section 8b extending in a direction perpendicular to the transport line of the conveyor 4.

In the adjacent chambers 1 and 2, (preheating chamber 1 and preheating chamber 1, preheating chamber 1 and reflow chamber 2, and reflow chamber 2 and reflow chamber 2), the fans 6 are installed in the chambers 1 and 2 so that their impeller centers are not on a single perpendicular plane along the transport line of the conveyor 4 and arrayed offset to the left and right in a direction perpendicular to the transport line of the conveyor 4 in mutually opposite directions from the centers of the chambers 1 and 2. In other words, the fans 6 are arranged left and right in a zigzag pattern along the transport line of the conveyor 4.

The fan storage sections 8a of the adjacent first casing members 8 are installed to overlap as seen horizontally from a direction perpendicular to the transport line of the conveyor 4. In this embodiment, the adjacent fans 6 also are installed to overlap as seen horizontally from a direction perpendicular to the transport line of the conveyor 4. In other words, the fan 6 has a diameter larger than the width along the direction of the transport line of the conveyor 4 in each of the chambers 1 and 2.

Multiple heaters 13 are installed in the space between the first casing member 8 and the second casing member 10.

A partition wall 14 separating the chambers 1 and 2 is structured as follows. The partition wall 14 on the upper side is described here, however the partition wall on the lower side is identically formed.

In other words, as shown in FIG. 3 through FIG. 6, a first wall 15 separating the first casing members 8 is installed between the adjacent first casing members 8 to separate these adjacent first casing members 8. The first wall 15 therefore do not extend in a straight line perpendicular to the transport line of the conveyor 4 but instead extend along the external side of the first casing member 8 and is therefore comprised of two straight walls 15a and 15b extending in a direction perpendicular to the transport line of the conveyor 4, and a slanted wall 15c linking these straight walls 15a and 15b.

A second wall 16 separating the second casing members 10 is installed between the adjacent second casing members 16 to separate these second casing members 16. This second wall 16 extends in a straight line in a direction perpendicular to the transport line of the conveyor 4 and intersects the slanted wall 15c of the first wall 15.

The first wall 15 is installed extending from the upper edge of the chambers 1 and 2 to a position slightly upward from the second casing member 10, and the second wall 16 is installed below it. The gap between the first wall 15 and the second wall 16 is sealed by a closing wall 17.

The flow of the heated gas is described next.

The nitrogen gas within the chambers 1 and 2 is drawn into the fan 6 from the intake opening 9 of the first casing member 8 by the fan 6. The nitrogen gas is at this time heated while passing through the heater 13. The heated nitrogen gas is discharged from the discharge opening of the fan 6, and enters the second casing member 10 after passing through the duct 12 and the gas guide section 8b of the first casing member 8, and is blown from the nozzle holes 11 onto the printed circuit board 5 mounted with electronic components on the conveyor 4, and the solder on the printed circuit board is heated. The nitrogen gas then enters a space 19 between the first casing member 8 and the second casing member 10 after passing through a space 18 between the second casing member 10 and its surrounding walls, and is drawn into the fan 6 while being heated by the heater 13 and is discharged to the gas guide section 8b of the first casing member 8.

The printed circuit board 5 mounted with the electronic components is in this way gradually heated in the preheating chamber 1 and the soldering paste melted in the reflow chamber 2. The melted solder on the printed circuit board 5 mounted with the electronic components is then cooled in the cooling chamber 3 and the soldering completed.

The fan 6, the first casing member 8 and the second casing member 10 are also installed in the same way inside the cooling chamber 3.

In this embodiment as described above, the centers of the impellers in the adjacent fans 6 are not on a single perpendicular plane along the transport line of the conveyor 4 and alternately arrayed offset to the left and right. The fans 6 are arrayed left and right in a zigzag pattern along the transport line of the conveyor. The fans 6 having a larger size or in other words greater power can therefore be installed without increasing the total length of the reflow soldering apparatus. A reflow soldering apparatus with both superior performance and a compact design can therefore be provided.

Another preferred embodiment of the present invention is described next while referring to the accompanying drawings FIG. 8 through FIG. 14.

Figure 8:
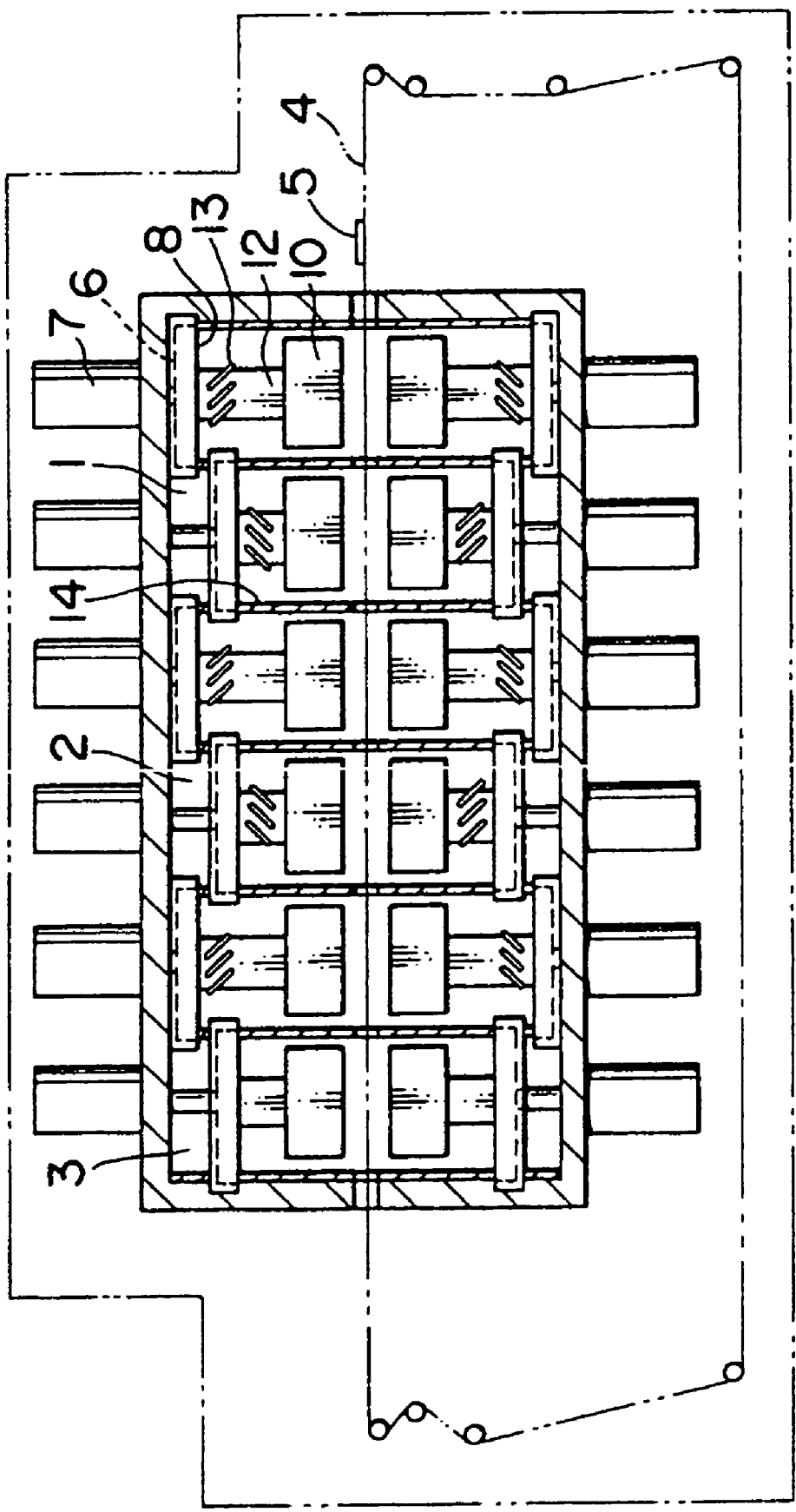
FIG. 8 is a vertical cross sectional view showing another preferred embodiment of the reflow soldering apparatus of the present invention.

A reflow soldering apparatus as shown in FIG. 8, is comprised of three preheating chambers 1, two reflow chambers 2, and one cooling chamber 3 which are arrayed in sequence along the transport line of a conveyor 4. Nitrogen gas is supplied into each of the chambers 1, 2 and 3 to prevent oxidation of the solder. A printed circuit board 5 mounted with electronic components is transported in sequence into each of the chambers 1, 2 and 3 by the conveyor 4. After the printed circuit board 5 mounted with electronic components is heated at a predetermined temperature in the preheating chamber 1, the soldering paste is melted in the reflow chamber 2, the melted solder then cooled in the cooling chamber 3, and the electronic components soldered onto the printed circuit board. Nitrogen gas is used in this embodiment to provide the gaseous atmosphere within each of the chambers 1, 2 and 3, however air may be used as the atmospheric gas.

The conveyor 4 makes a transport line arranged horizontally in a forward path in approximately the vertical center of each of the chambers 1, 2 and 3 from the entrance of the preheating chamber 1 to the exit of the cooling chamber 3 and in a return path arranged at the lower outer side of the chambers 1, 2 and 3 forming an endless chain conveyor.

Heated gas circulating systems of the same structure are provided above and below the conveyor 4 in the preheating chamber 1 and the reflow chamber 2. The system on the upper side is described here, however the system on the lower side has an identical structure.

Figure 9:
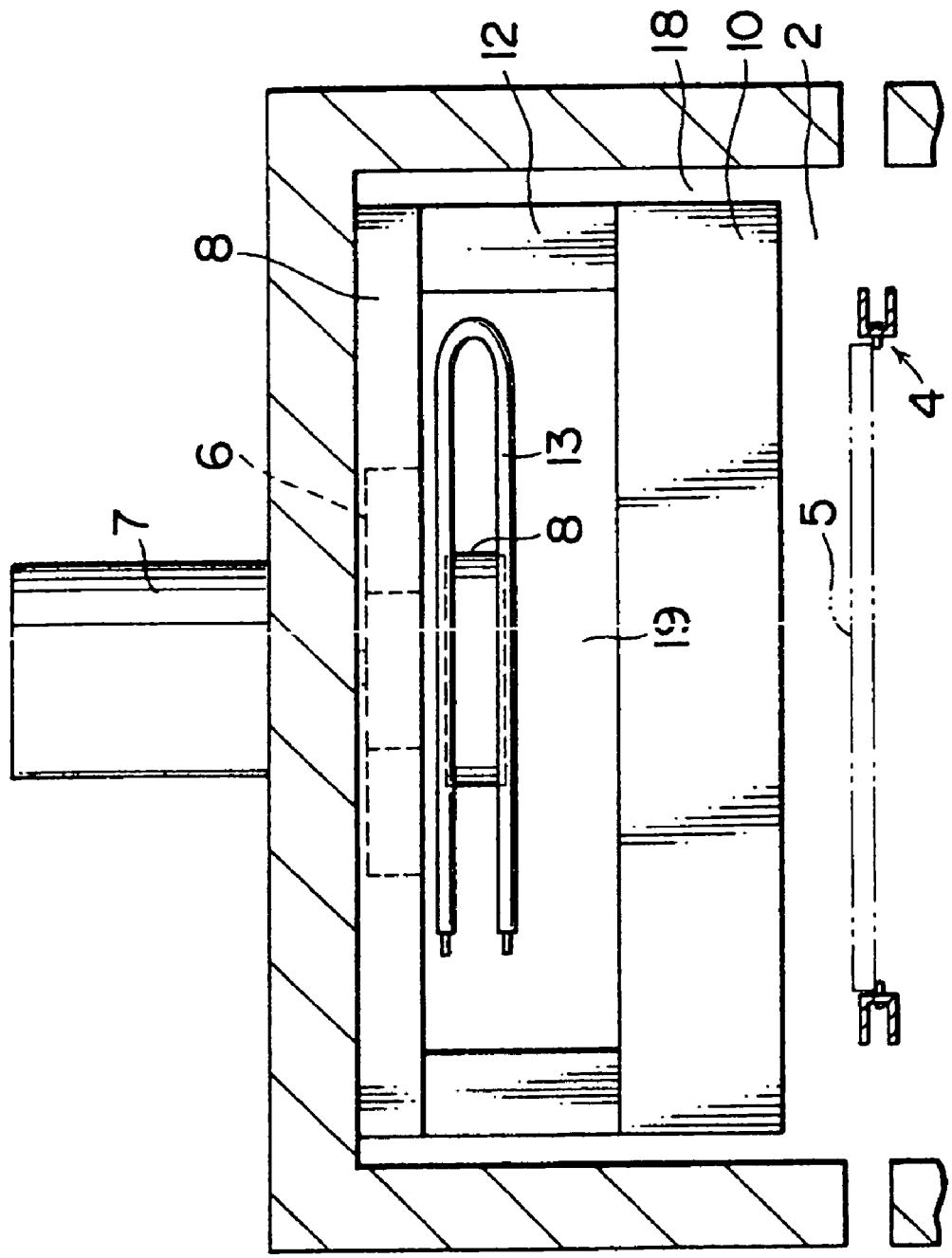
FIG. 9 is a vertical cross sectional view of a portion of the reflow soldering apparatus cut at a right angle to the transport line of the conveyor.
Figure 10:
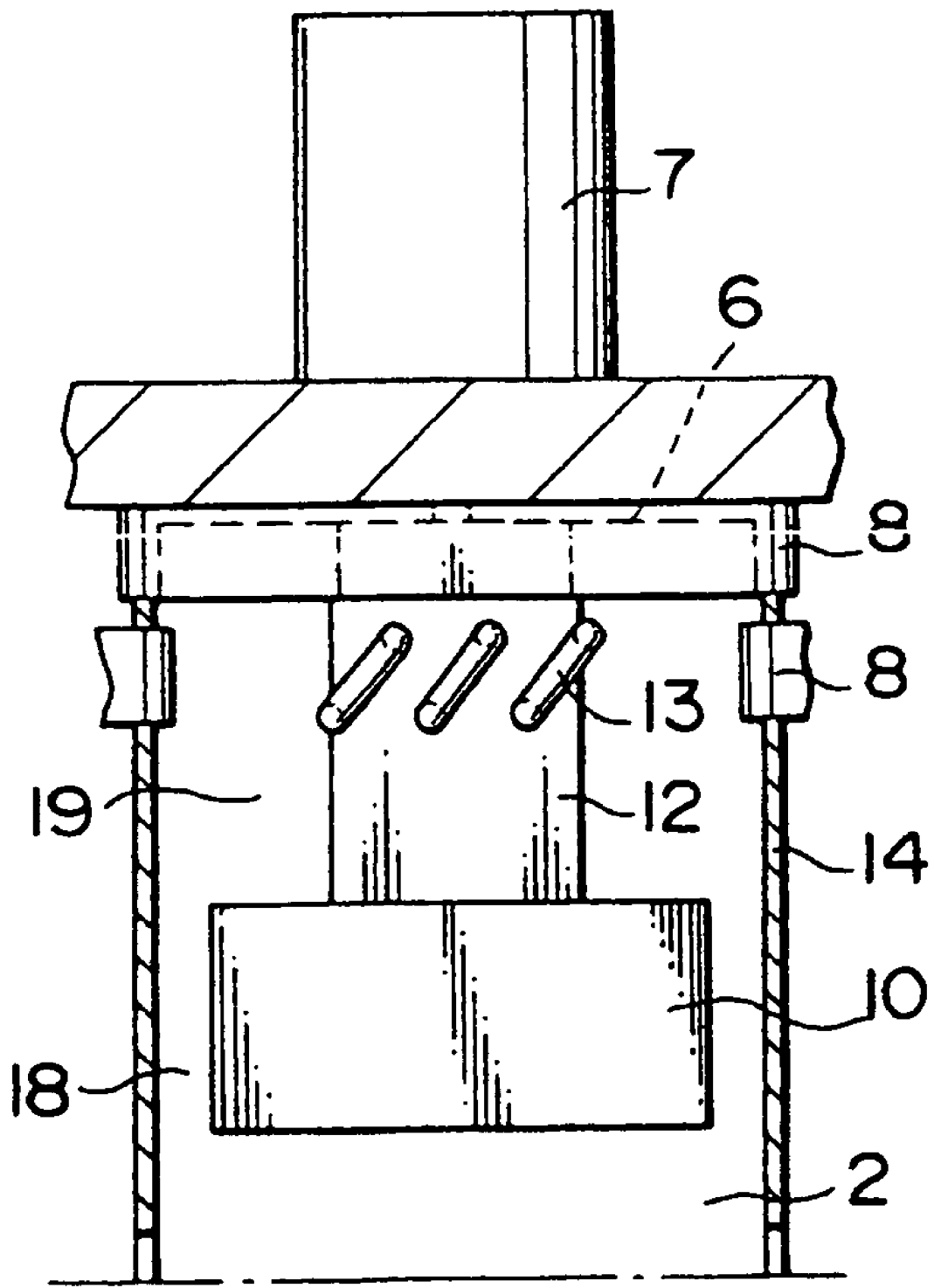
FIG. 10 is an enlarged view of a portion of FIG. 8.
Figure 11:
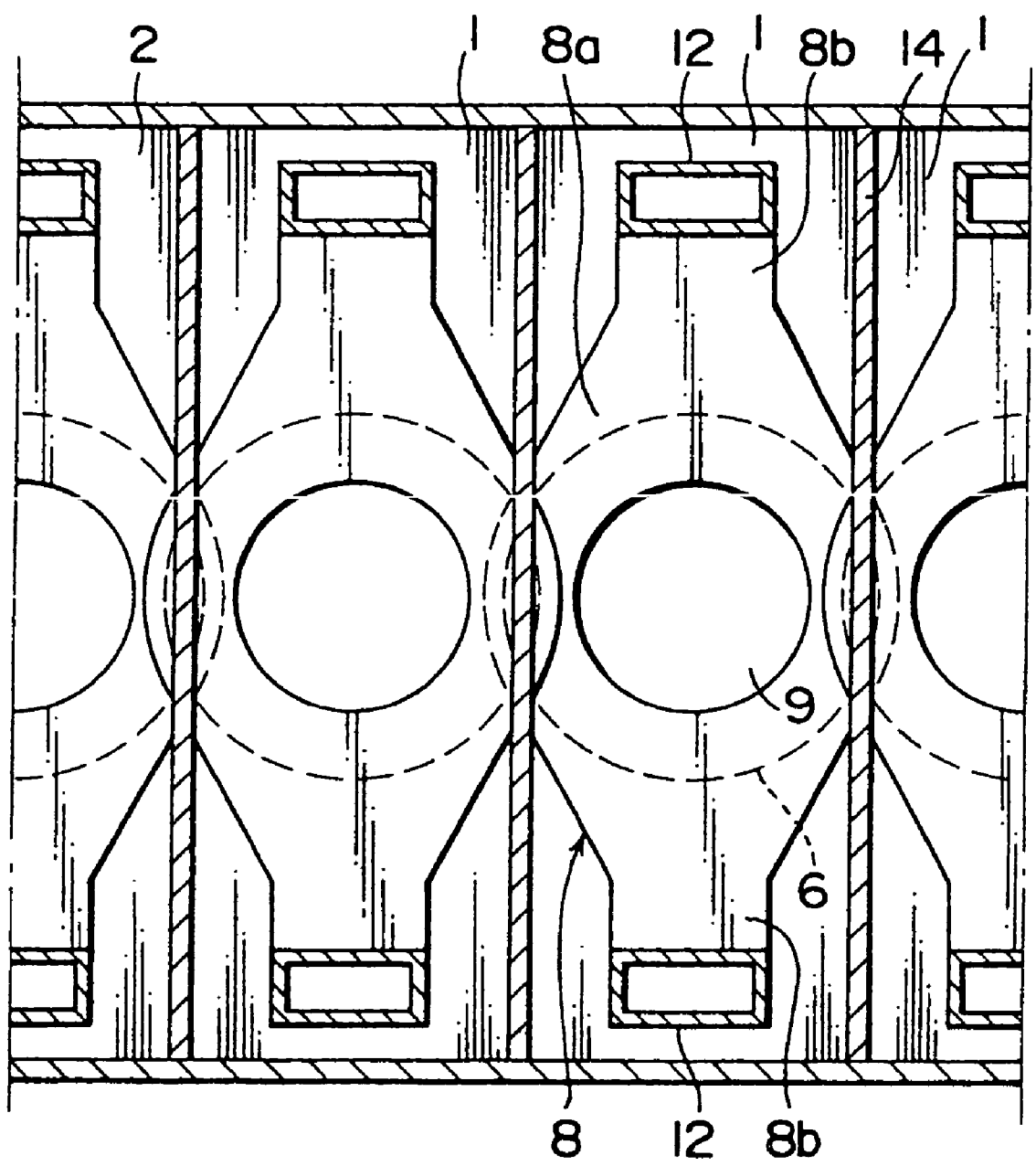
FIG. 11 is a horizontal cross sectional view of a portion of the reflow soldering apparatus and shows the first casing member.
Figure 12:
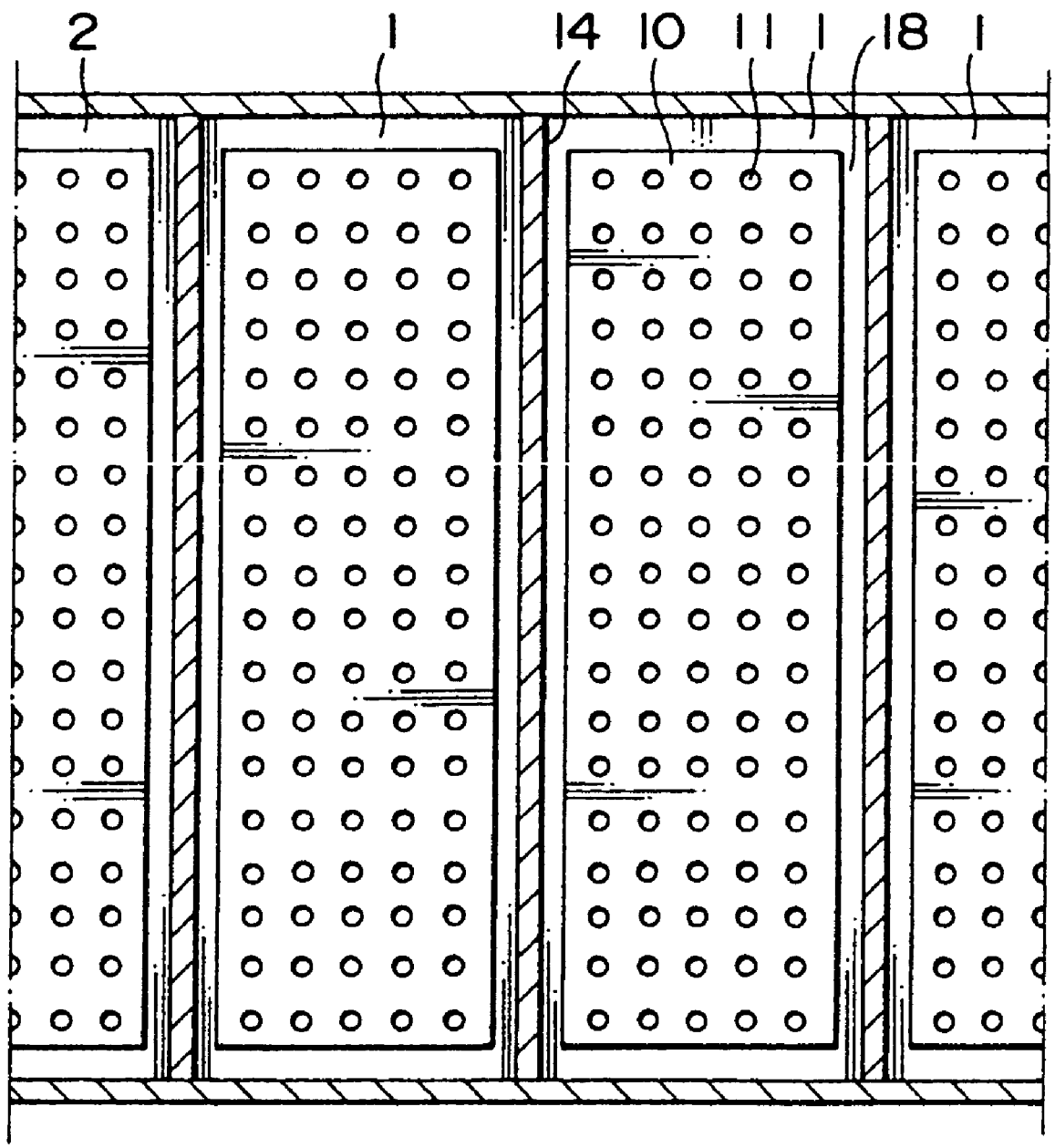
FIG. 12 is a horizontal cross sectional view of a portion of the reflow soldering apparatus and shows the second casing member.
Figure 13:
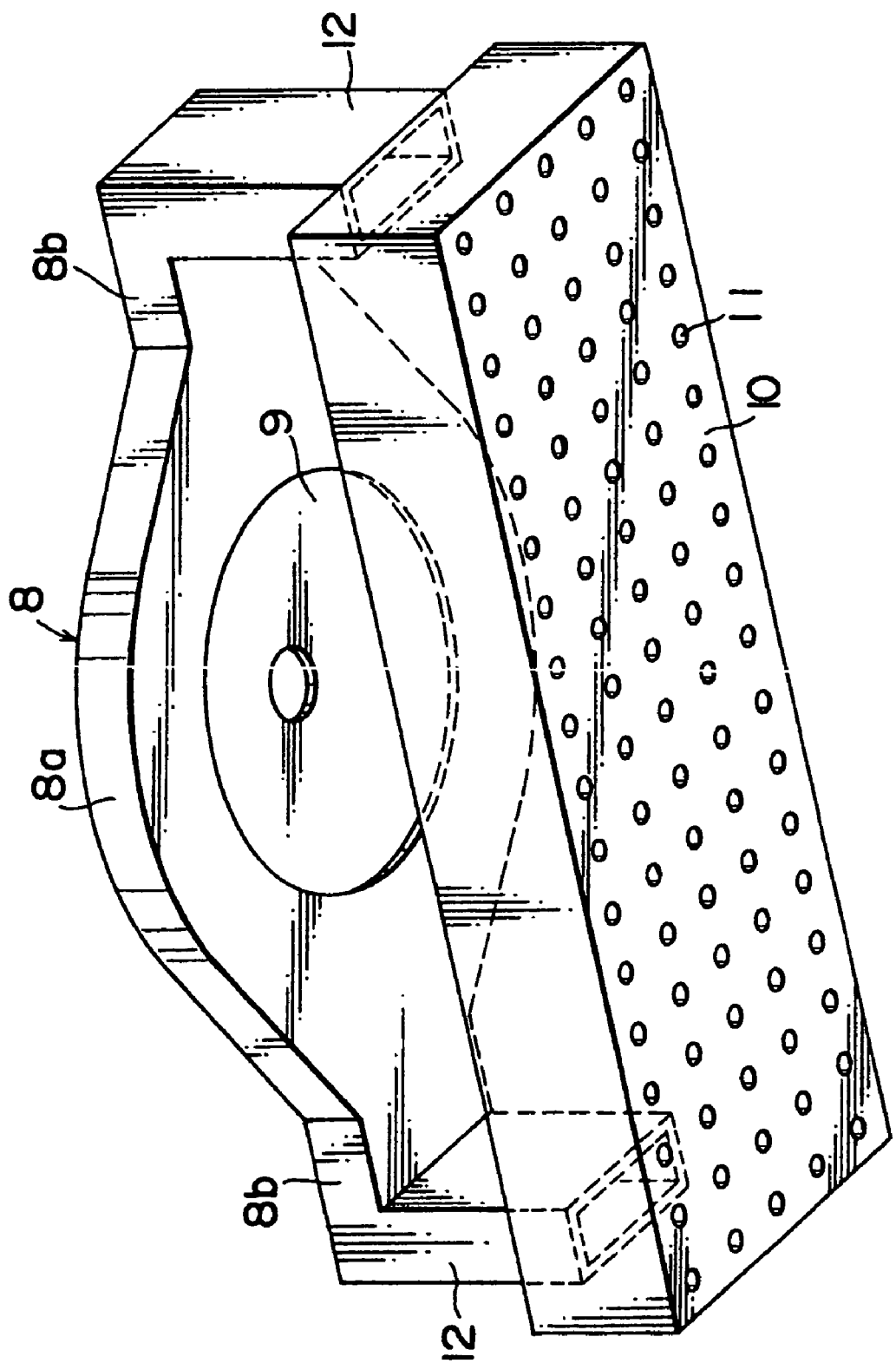
FIG. 13 is a perspective view showing a first and second casing member connected by a duct of a short length.
Figure 14:
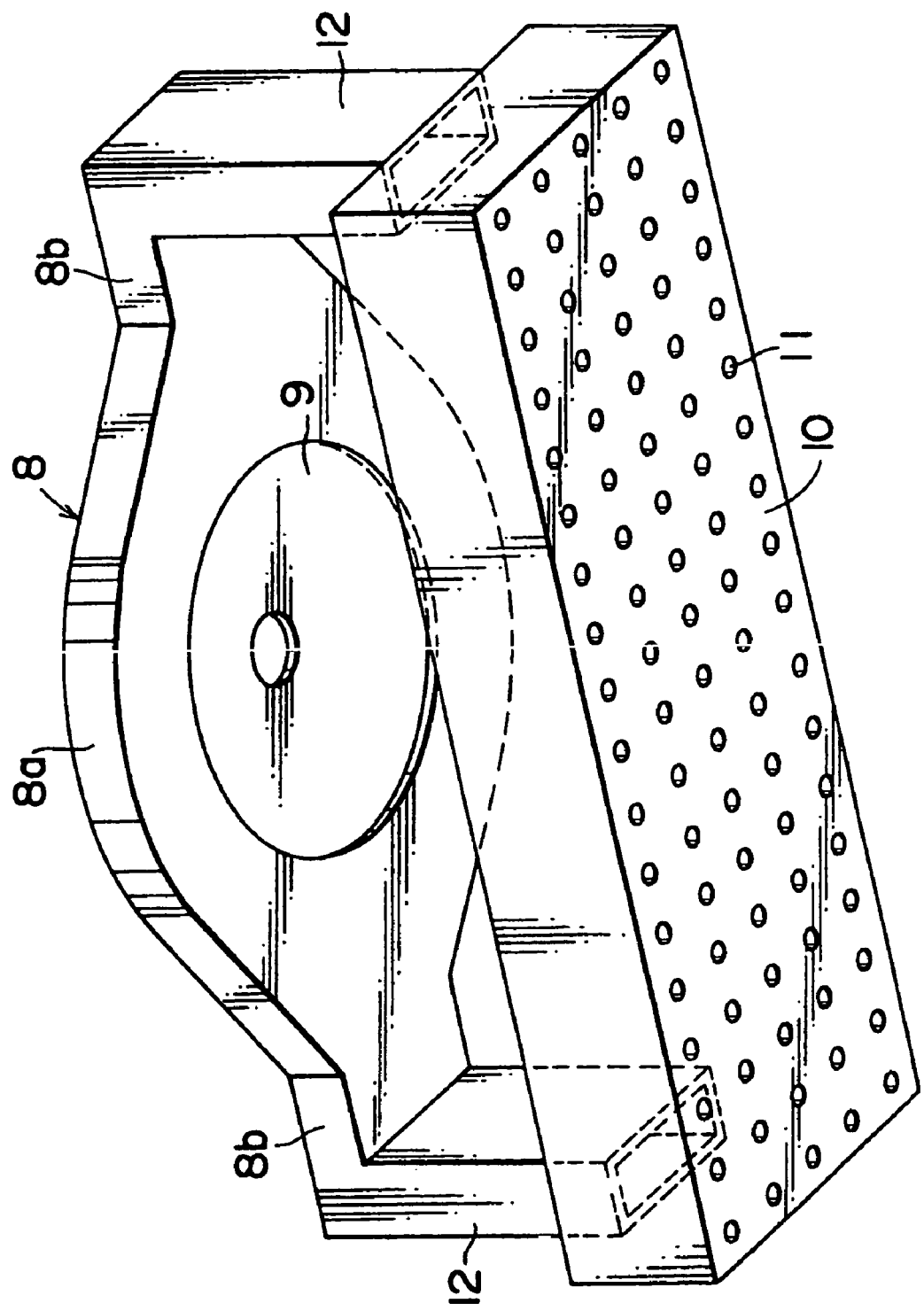
FIG. 14 is a perspective view showing a first and second casing member connected by a duct of a long length.

Fans 6 are installed respectively at the upper edge within the chambers 1 and 2 as shown in FIG. 8 through FIG. 10. Each of the fans 6 has a vertical rotating shaft 6a and connects to a respective motor 7 installed on the upper external side of each of the chambers 1 and 2. The fans 6 are multiblade fans or turbo fans, etc. The fan 6 has an intake opening in the center on the bottom side and a discharge opening on the external circumference, and is housed within a first casing member 8.

The first casing member 8 (see FIG. 8 through FIG. 11, FIG. 13 and FIG. 14) is comprised of a fan storage section 8a and a gas guide section 8b. The fan storage section 8a houses the fan 6 and has an intake opening 9 on the lower surface facing the intake opening of the fan 6. The gas guide section 8b extends to a fixed length in both directions from the fan storage section 8a and has a width smaller than the diameter of the fan 6.

A second casing member 10 (see FIG. 8 through FIG. 10, and FIG. 12 through FIG. 14) is installed between the first casing member 8 and the conveyor 4. The second casing member 10 is a rectangular case member as seen from a plan view and has a large number of heated gas nozzle holes 11 on the side facing the conveyor 4. The width of the second casing member 10 in the transport line of the conveyor 4 is larger than the width of the gas guide section 8b of the first casing member 8 and is smaller than the diameter of the fan 6.

In the first casing member 8, the ends of the pair of gas guide sections 8b are connected to both ends of the second casing member 10 by a duct 12.

The first casing member 8 and the second casing member 10 connected by the duct 12 are installed in each of the chambers 1 and 2. The first casing member 8 is arranged with the gas guide section 8b extending in a direction perpendicular to the transport line of the conveyor 4.

In the adjacent chambers 1 and 2, (preheating chamber 1 and preheating chamber 1, preheating chamber 1 and reflow chamber 2, and reflow chamber 2 and reflow chamber 2), the fans 6 are installed in the chambers 1 and 2 so that their impeller centers are not on a single horizontal plane along the transport line of the conveyor 4 and alternately arrayed offset up and down in a direction perpendicular to the transport line of the conveyor 4. In other words, the fans 6 are arranged above and below in a zigzag pattern along the transport line of the conveyor 4.

The second casing member 10 is installed at a fixed height from the conveyor 4, so that the length of the duct 12 connecting the first casing member 8 and the second casing member 10 are different in the adjacent chambers 1 and 2.

The fan storage sections 8a of the adjacent first casing members 8 are installed to overlap as seen vertically from a direction perpendicular to the transport line of the conveyor 4. In this embodiment, the adjacent fans 6 also are installed to overlap as seen vertically from a direction perpendicular to the transport line of the conveyor 4. In other words, the fan 6 has a diameter larger than the width along the direction of the transport line of the conveyor 4 in each of the chambers 1 and 2.

Multiple heaters 13 are installed in the space between the first casing member 8 and the second casing member 10.

A partition wall 14 separating the chambers 1 and 2 is installed between the adjacent second casing members 10 to separate these adjacent second casing members 8 as shown in FIG. 8, FIG. 9, FIG. 11 and FIG. 12. The partition wall 14 extends in a straight line vertically to intersect the transport line of the conveyor 4. A portion of the fan storage section 8a of the first casing member 8 is arranged in each of the chambers 1 and 2 to protrude from the partition wall 14.

The flow of the heated gas is described next.

The nitrogen gas within the chambers 1 and 2 is drawn into the fan 6 from the intake opening 9 of the first casing member 8 by the fan 6. The nitrogen gas is at this time heated while passing through the heater 13. The heated nitrogen gas is discharged from the discharge opening of the fan 6, and enters the second casing member 10 after passing through the duct 12 and the gas guide section 8b of the first casing member 8, and is blown from the nozzle holes 11 onto the printed circuit board 5 mounted with electronic components on the conveyor 4, and the solder on the printed circuit board is heated. The nitrogen gas then enters a space 19 between the first casing member 8 and the second casing member 10 after passing through a space 18 between the second casing member 10 and its surrounding walls, and is drawn into the fan 6 while being heated by the heater 13 and is discharged to the gas guide section 8b of the first casing member 8.

The printed circuit board 5 mounted with the electronic components is in this way gradually heated in the preheating chamber 1 and the soldering paste melted in the reflow chamber 2. The melted solder on the printed circuit board 5 mounted with the electronic components is then cooled in the cooling chamber 3 and the soldering completed.

The fan 6, the first casing member 8 and the second casing member 10 are also installed in the same way inside the cooling chamber 3.

In this embodiment as described above, the centers of the impellers in the adjacent fans 6 are not on a single horizontal plane and alternately arrayed offset up and down. The fans 6 are arrayed above and below in a zigzag pattern along the transport line of the conveyor 4. The fans 6 having a larger size or in other words greater power can therefore be installed without increasing the total length of the reflow soldering apparatus. A reflow soldering apparatus with both superior performance and a compact design can therefore be provided.

Another preferred embodiment of the present invention is described next while referring to the accompanying drawings FIG. 15 through FIG. 18.

Figure 15:
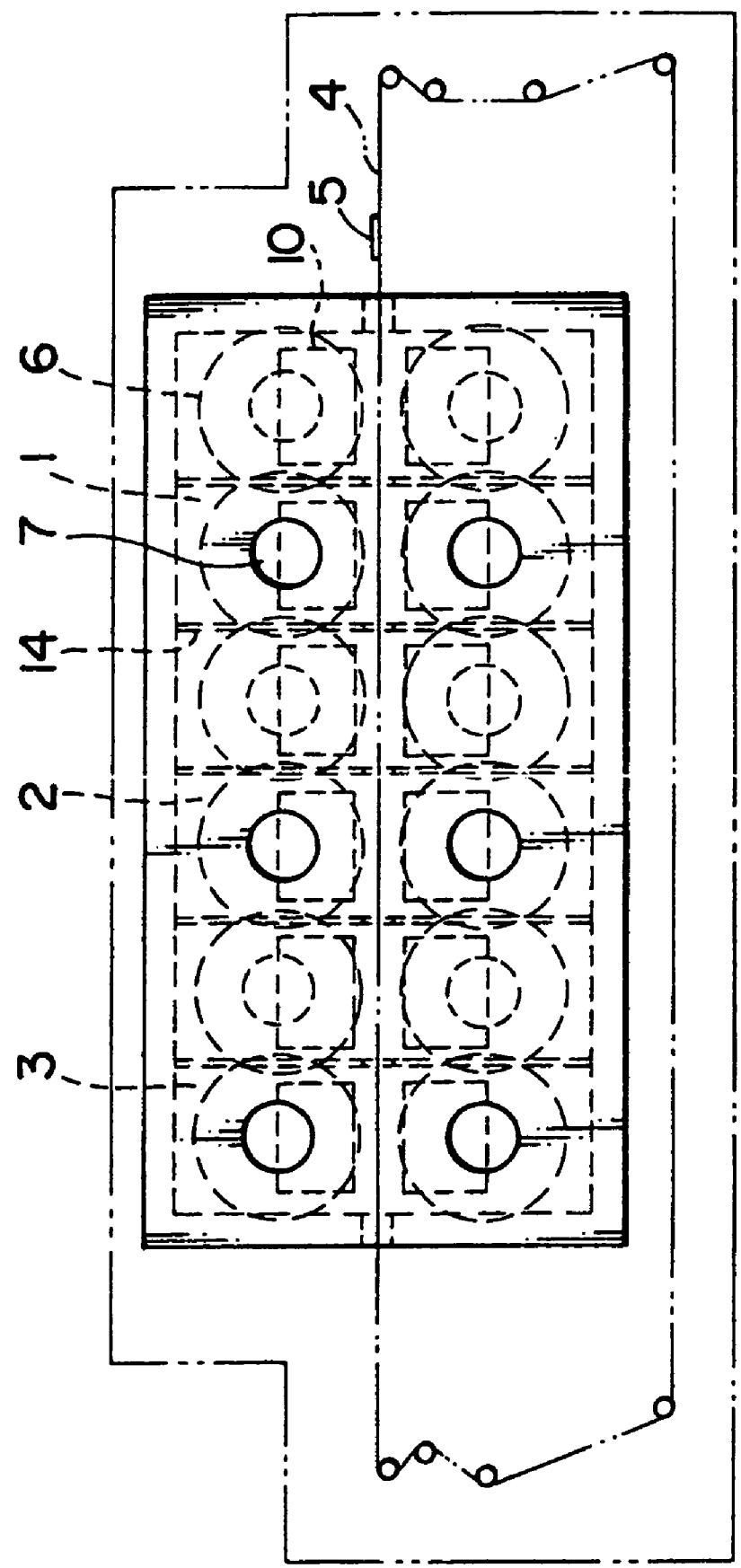
FIG. 15 is a front view showing another preferred embodiment of the reflow soldering apparatus of the present invention.

A reflow soldering apparatus as shown in FIG. 15, is comprised of three preheating chambers 1, two reflow chambers 2, and one cooling chamber 3 which are arrayed in sequence along the transport line of a conveyor 4. Nitrogen gas is supplied into each of the chambers 1, 2 and 3 to prevent oxidation of the solder. A printed circuit board 5 mounted with electronic components is transported in sequence into each of the chambers 1, 2 and 3 by the conveyor 4. After the printed circuit board 5 mounted with electronic components is heated at a predetermined temperature in the preheating chamber 1, the soldering paste is melted in the reflow chamber 2, the melted solder then cooled in the cooling chamber 3, and the electronic components soldered onto the printed circuit board. Nitrogen gas is used in this embodiment to provide the gaseous atmosphere within each of the chambers 1, 2 and 3, however air may be used as the atmospheric gas.

The conveyor 4 makes a transport line arranged horizontally in a forward path in approximately the vertical center of each of the chambers 1, 2 and 3 from the entrance of the preheating chamber 1 to the exit of the cooling chamber 3 and in a return path arranged at the lower outer side of the chambers 1, 2 and 3 forming an endless chain conveyor.

Heated gas circulating systems of the same structure are provided above and below the conveyor 4 in the preheating chamber 1 and the reflow chamber 2. The system on the upper side is described here, however the system on the lower side has an identical structure.

Figure 16:
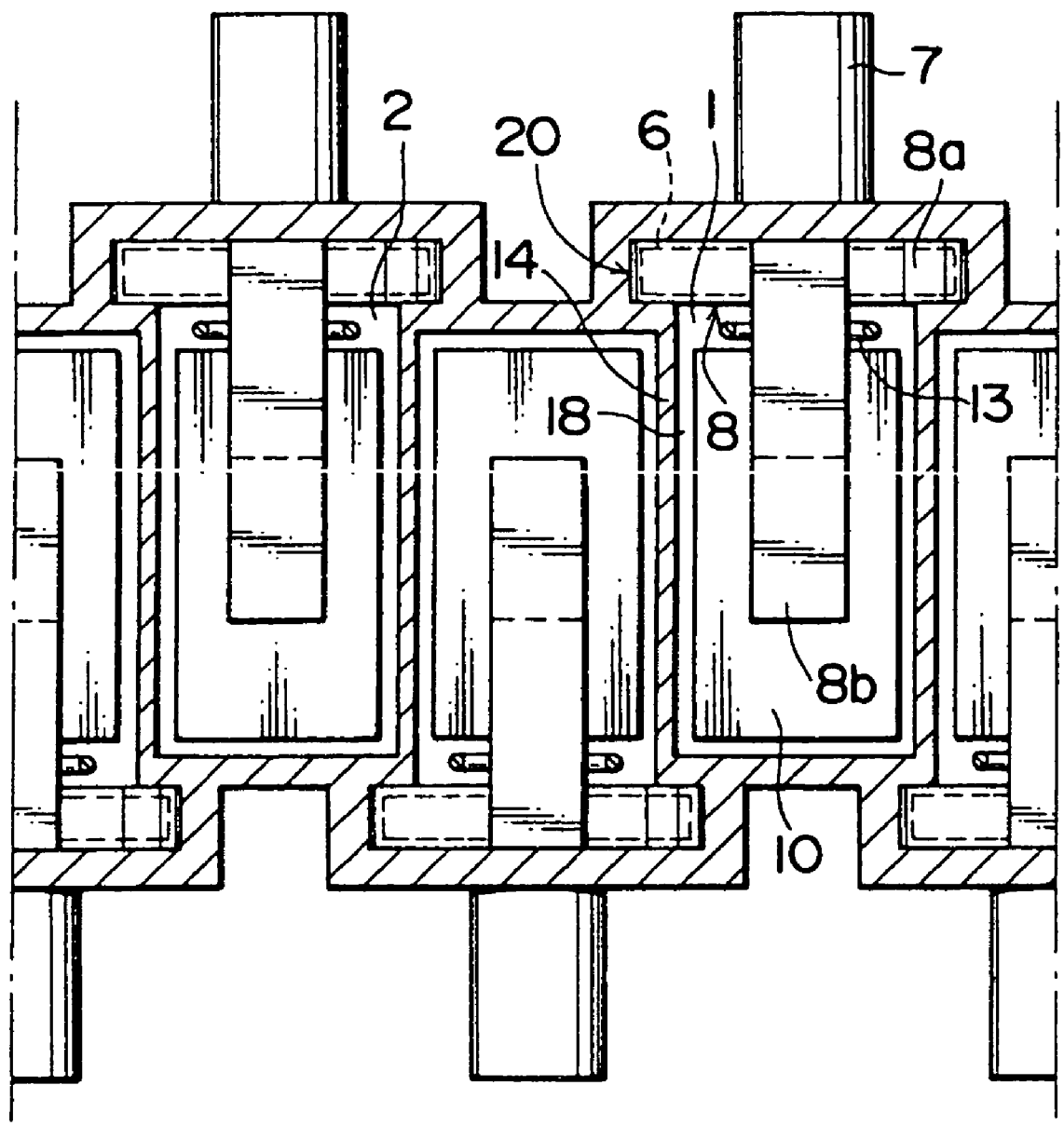
FIG. 16 is a horizontal cross sectional view of a portion of the reflow soldering apparatus.
Figure 17:
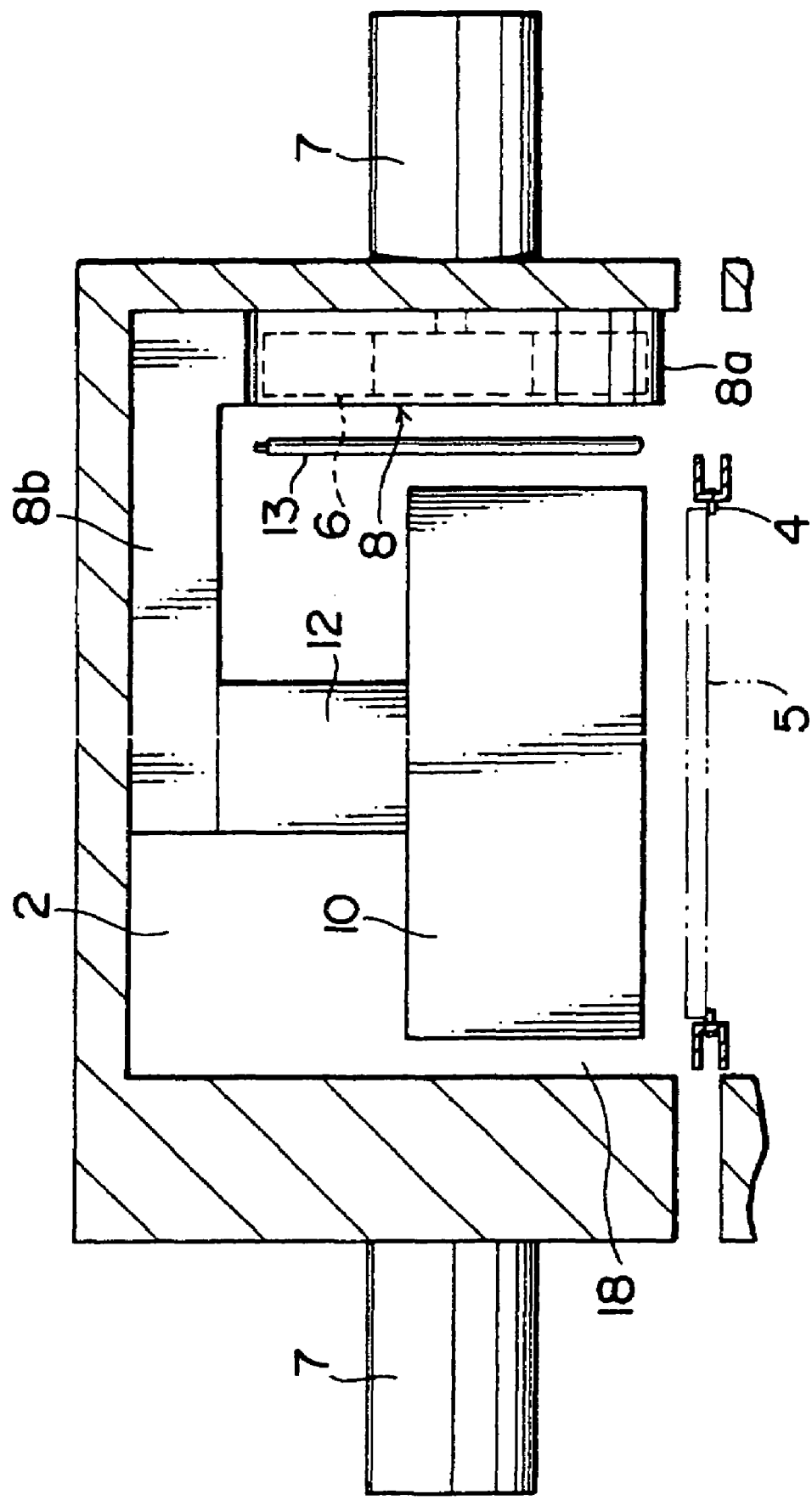
FIG. 17 is a vertical cross sectional view of a portion of the reflow soldering apparatus.
Figure 18:
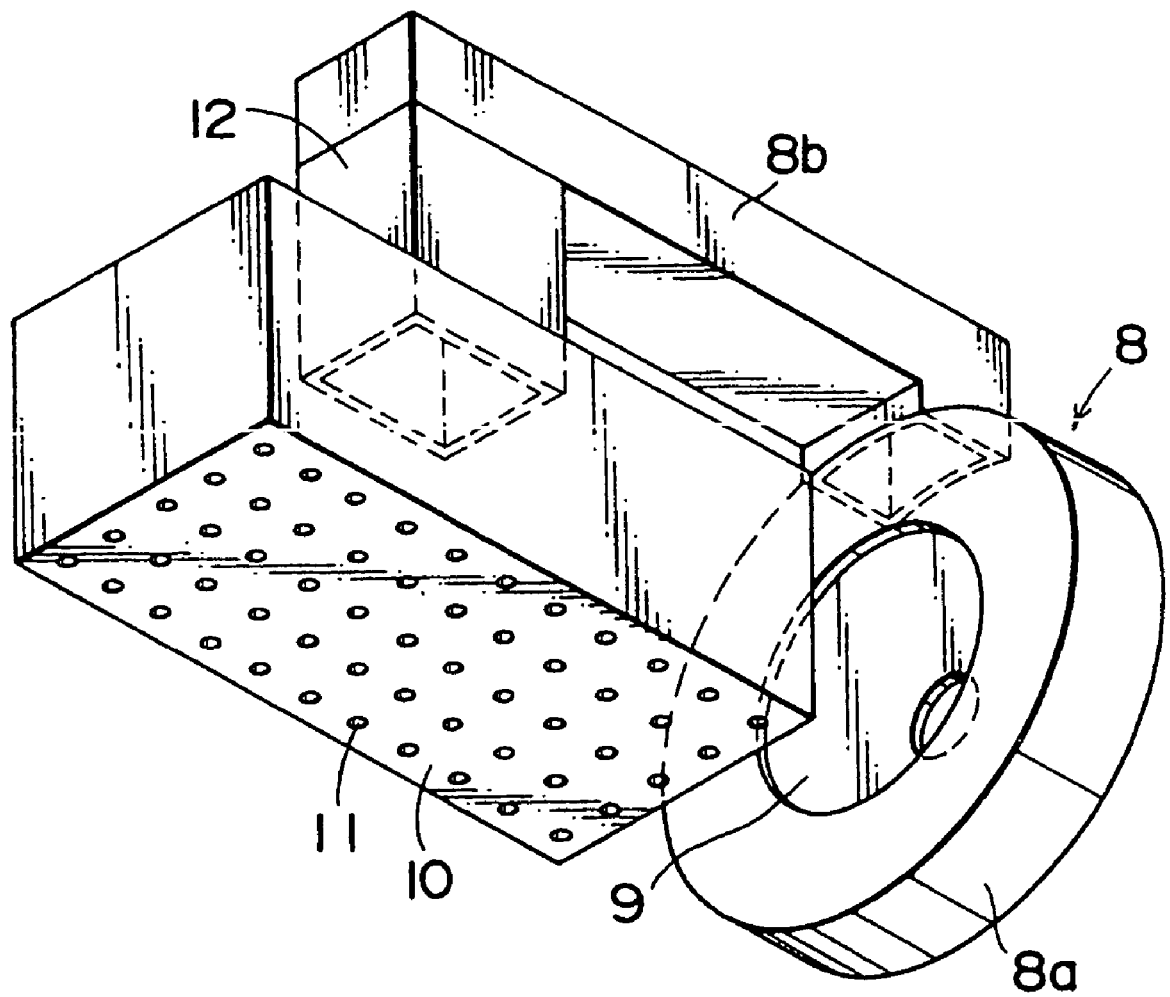
FIG. 18 is a perspective view showing a first and second casing member connected by a duct.

Fans 6 are installed respectively at the side within the chambers 1 and 2 as shown in FIG. 15 through FIG. 17. Each of the fans 6 has a horizontal rotating shaft 6a and connects to a respective motor 7 installed on the external side of each of the chambers 1 and 2. The fans 6 are multiblade fans or turbo fans, etc. The fan 6 has an intake opening in the center facing the inner side in each of the chambers 1 and 2 and a discharge opening on the external circumference, and is housed within a first casing member 8.

In the adjacent chambers 1 and 2, (preheating chamber 1 and preheating chamber 1, preheating chamber 1 and reflow chamber 2, and reflow chamber 2 and reflow chamber 2), the fans 6 are installed in mutually opposite side on the left and right to the transport line. In other words, the fans 6 are installed in the chambers 1 and 2 so that their impeller centers are not on a single perpendicular plane along the transport line of the conveyor 4 and alternately arrayed offset to the left and right in a direction perpendicular to the transport line of the conveyor 4. The fans 6 are arranged left and right in a zigzag pattern along the transport line of the conveyor 4.

The first casing member 8 (see FIG. 16 through FIG. 18) is comprised of a fan storage section 8a and a gas guide section 8b. The fan storage section 8a houses the fan 6 and has an intake opening 9 on the surface facing the intake opening of the fan 6. The gas guide section 8b extends from the upper edge of the fan storage section 8a toward the center section in each of the chambers 1 and 2.

A second casing member 10 (see FIG. 15 through FIG. 18) is installed above the conveyor 4. The second casing member 10 is a rectangular case member as seen from a plan view and has a large number of heated gas nozzle holes 11 on the side facing the conveyor 4. The width of the second casing member 10 in the transport line of the conveyor 4 is smaller than the diameter of the fan 6.

The end of the gas guide section 8b in the first casing member 8 is connected to the upper surface center section of the second casing member 10 by a duct 12.

The fan storage sections 8a of the adjacent first casing members 8 are installed to overlap as seen horizontally from a direction perpendicular to the transport line of the conveyor 4. In this embodiment, the adjacent fans 6 also are installed to overlap as seen horizontally from a direction perpendicular to the transport line of the conveyor 4. In other words, the fan 6 has a diameter larger than the width along the direction of the transport line of the conveyor 4 in each of the chambers 1 and 2.

Multiple heaters 13 are installed in the space located forward of the intake opening 9 in the first casing member 8.

A partition wall 14 separating the chambers 1 and 2 is installed between the adjacent second casing members 10 as shown in FIG. 15 and FIG. 16. The partition wall 14 extends vertically in a straight line perpendicular to the transport line of the conveyor 4. In the chambers 1 and 2, a small chamber 20 containing the fan storage section 8a of the first casing member 8 is formed to protrude on the side of the second casing member 10. The small chambers 20 are formed on one side of the chambers 1 and 2 respectively, and are arranged on the opposite side to each other in the adjacent chambers 1 and 2.

The flow of the heated gas is described next.

The nitrogen gas within the chambers 1 and 2 is drawn into the fan 6 from the intake opening 9 of the first casing member 8 by the fan 6. The nitrogen gas is at this time heated while passing through the heater 13. The heated nitrogen gas is discharged from the discharge opening of the fan 6, and enters the second casing member 10 after passing through the duct 12 and the gas guide section 8b of the first casing member 8, and is blown from the nozzle holes 11 onto the printed circuit board 5 mounted with electronic components on the conveyor 4, and the solder on the printed circuit board is heated. The nitrogen gas then passes through a space 18 between the second casing member 10 and its surrounding walls, and is drawn into the fan 6 while being heated by the heater 13 and is discharged to the gas guide section 8b of the first casing member 8.

The printed circuit board 5 mounted with the electronic components is in this way gradually heated in the preheating chamber 1 and the soldering paste melted in the reflow chamber 2. The melted solder on the printed circuit board 5 mounted with the electronic components is then cooled in the cooling chamber 3 and the soldering completed.

The fan 6, the first casing member 8 and the second casing member 10 are also installed in the same way inside the cooling chamber 3.

In this embodiment as described above, the centers of the impellers in the adjacent fans 6 are not on a single perpendicular plane along the transport line of the conveyor 4 and alternately arrayed offset to the left and right. The fans 6 are arrayed left and right in a zigzag pattern along the transport line of the conveyor 4. The fans 6 having a larger size or in other words greater power can therefore be installed without increasing the total length of the reflow soldering apparatus. A reflow soldering apparatus with both superior performance and a compact design can therefore be provided.

In this embodiment, the fans are installed on the opposite side to each other in the adjacent chambers. However, the fans may all be installed on the same side and may be arrayed left and right or above and below in a zigzag pattern as described in the first and second embodiments.

Another preferred embodiment of the present invention is described next while referring to the accompanying drawings FIG. 19 through FIG. 23.

Figure 19:
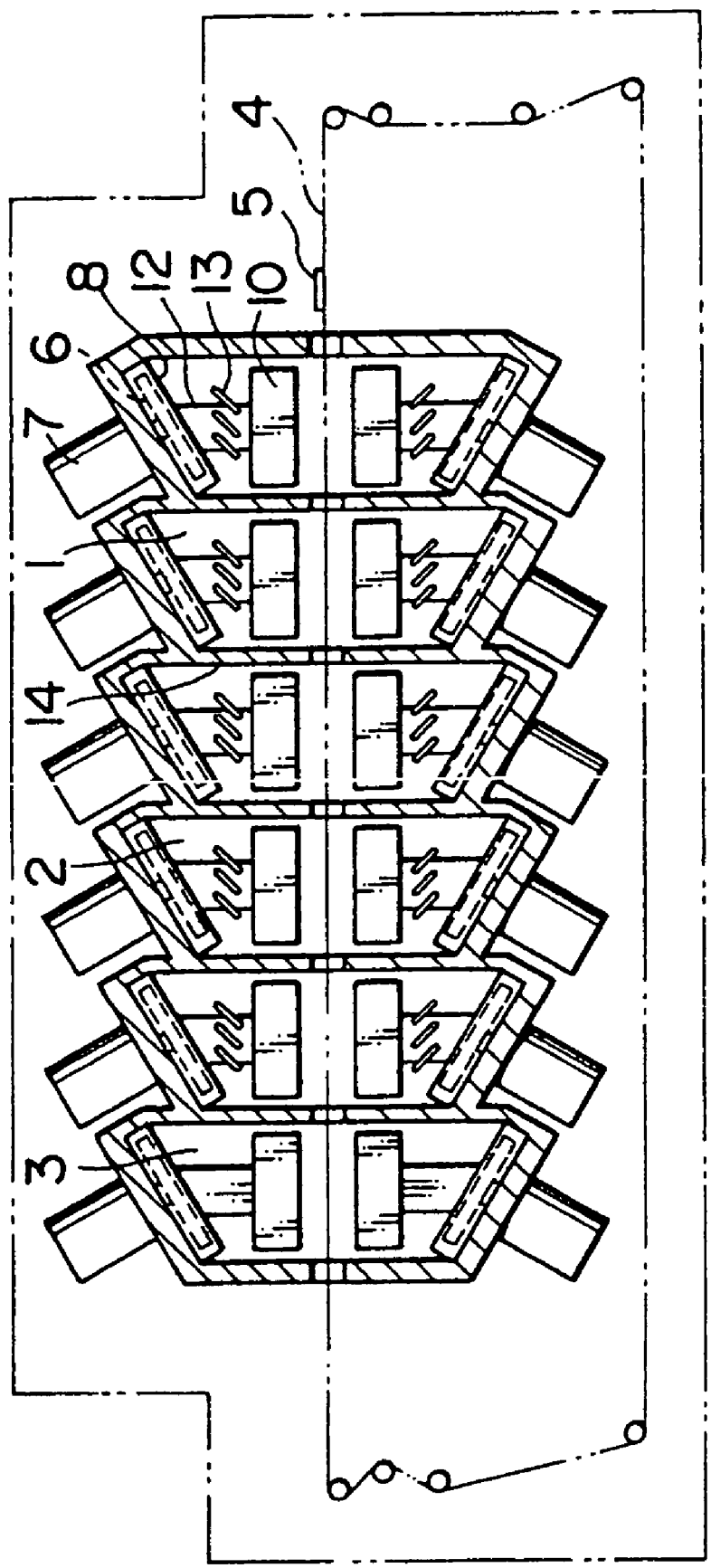
FIG. 19 is a vertical cross sectional view showing another preferred embodiment of the reflow soldering apparatus of the present invention.

A reflow soldering apparatus as shown in FIG. 19, is comprised of three preheating chambers 1, two reflow chambers 2, and one cooling chamber 3 which are arrayed in sequence along the transport line of a conveyor 4. Nitrogen gas is supplied into each of the chambers 1, 2 and 3 to prevent oxidation of the solder. A printed circuit board 5 mounted with electronic components is transported in sequence into each of the chambers 1, 2 and 3 by the conveyor 4. After the printed circuit board 5 mounted with electronic components is heated at a predetermined temperature in the preheating chamber 1, the soldering paste is melted in the reflow chamber 2, the melted solder then cooled in the cooling chamber 3, and the electronic components soldered onto the printed circuit board. Nitrogen gas is used in this embodiment to provide the gaseous atmosphere within each of the chambers 1, 2 and 3, however air may be used as the atmospheric gas.

The conveyor 4 makes a transport line arranged horizontally in a forward path in approximately the vertical center of each of the chambers 1, 2 and 3 from the entrance of the preheating chamber 1 to the exit of the cooling chamber 3 and in a return path arranged at the lower outer side of the chambers 1, 2 and 3 forming an endless chain conveyor.

Heated gas circulating systems of the same structure are provided above and below the conveyor 4 in the preheating chamber 1 and the reflow chamber 2. The system on the upper side is described here, however the system on the lower side has an identical structure.

Figure 20:
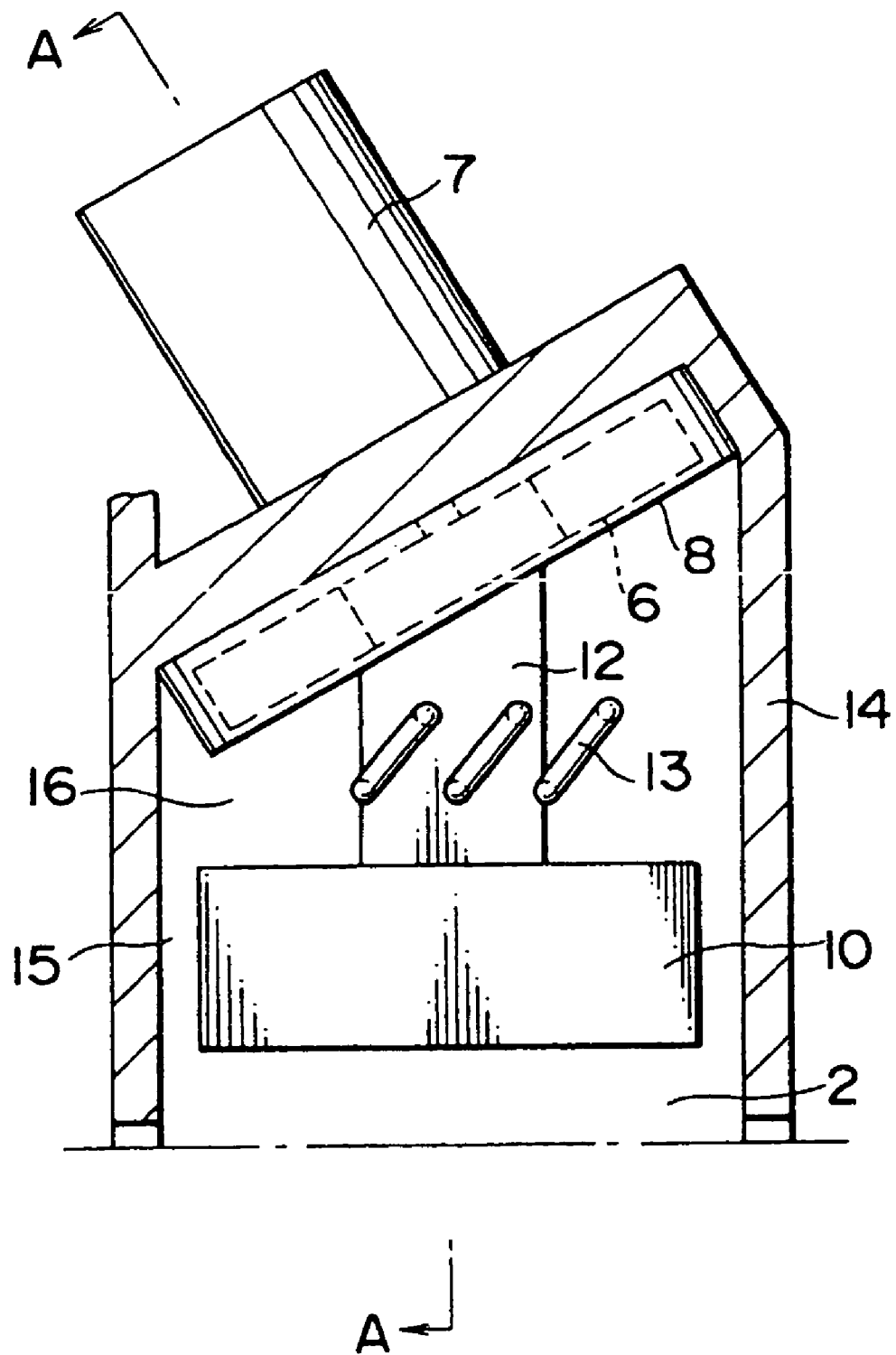
FIG. 20 is an enlarged view of a portion of FIG. 19.
Figure 21:
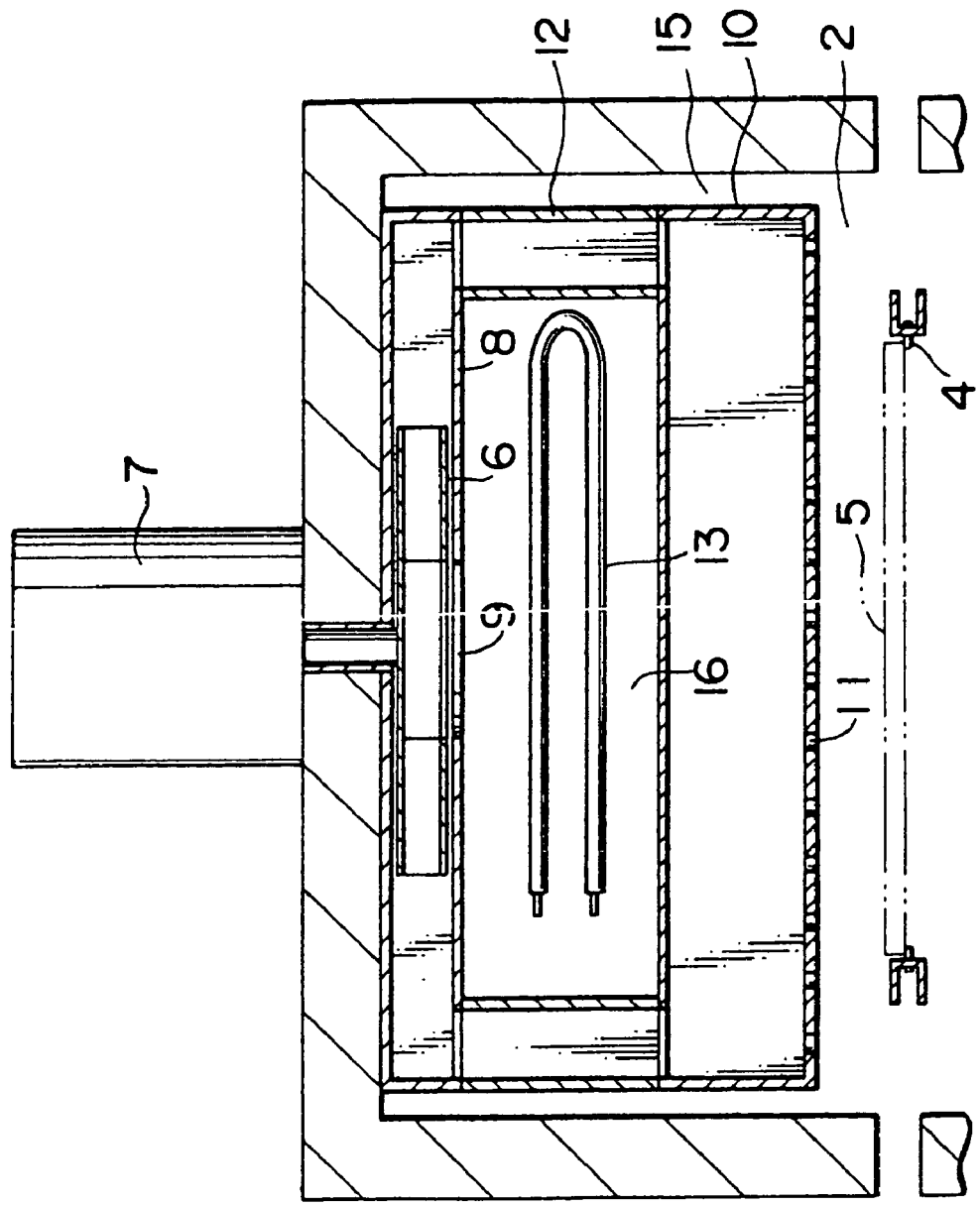
FIG. 21 is a cross sectional view taken along line A-A of FIG. 20.
Figure 22:
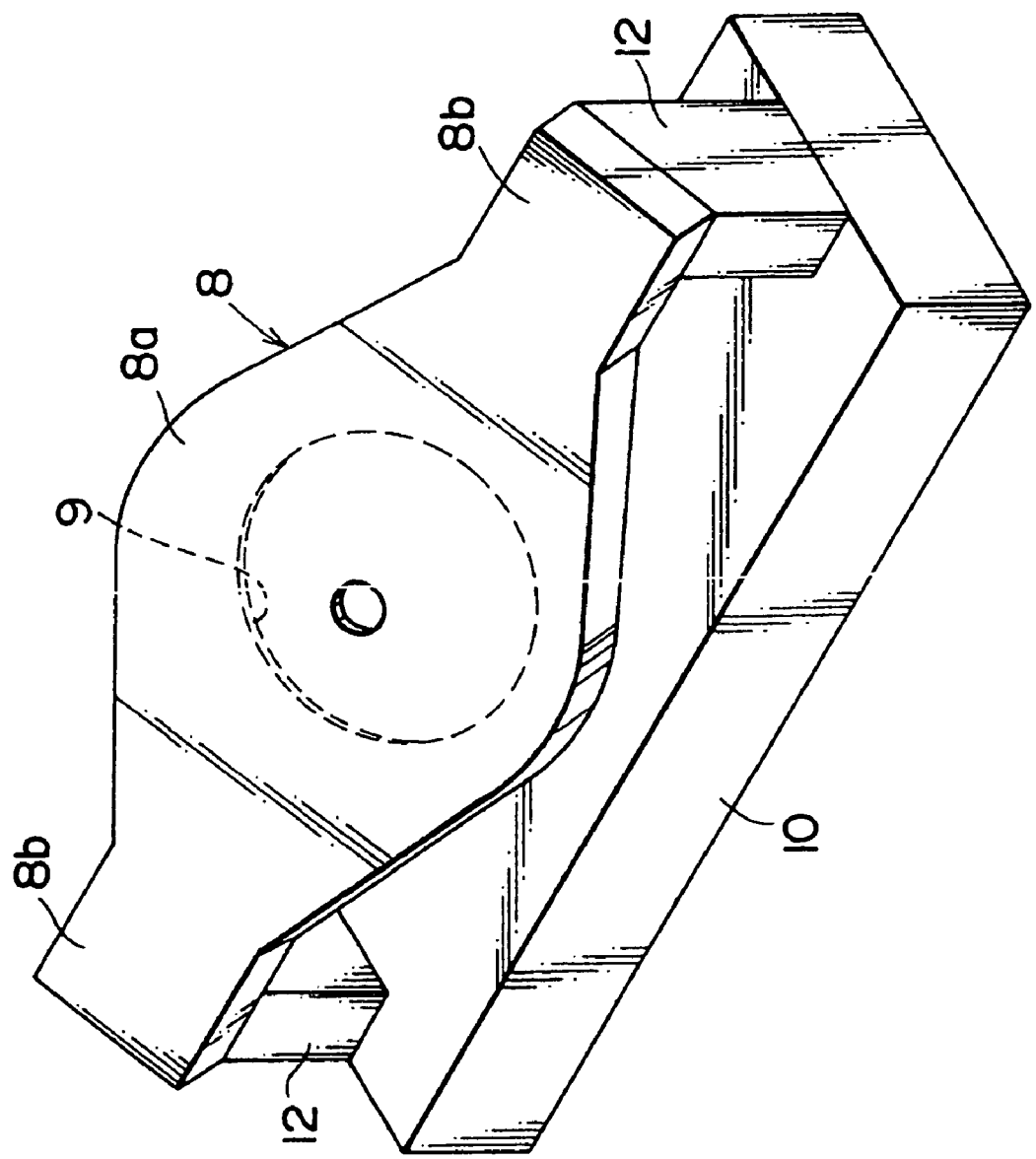
FIG. 22 is a perspective view showing a first and second casing member connected by a duct.

Fans 6 are installed respectively at the upper edge within the chambers 1 and 2 as shown in FIG. 19 through FIG. 21. Each of the fans 6 connects to a respective motor 7 installed on the upper external side of each of the chambers 1 and 2. The fans 6 are arranged in a inclined position. In other words, in this embodiment, the fans 6 are arranged with their rotating shafts 6a inclined along the forward direction of progression of the transport line of the conveyor 4. The upper wall of the chambers 1 and 2 that the rotating shaft 6a of the fan 6 passes through is a diagonal wall, and the motor 7 is installed in a inclined position on the upper surface of the upper wall. The fans 6 are multiblade fans or turbo fans, etc. The fan 6 has an intake opening in the center on the bottom side and a discharge opening on the external circumference, and is housed within a first casing member 8.

The first casing member 8 (see FIG. 19 through FIG. 22) is comprised of a fan storage section 8a and a gas guide section 8b. The fan storage section 8a houses the fan 6 and has an intake opening 9 on the lower surface facing the intake opening of the fan 6. The gas guide section 8b extends to a fixed length in both directions from the fan storage section 8a and has a width smaller than the diameter of the fan 6. The first casing member 8 is also arranged diagonally at the same inclined angle as the fan 6.

A second casing member 10 (see FIG. 19 through FIG. 22) is installed between the first casing member 8 and the conveyor 4. The second casing member 10 is a rectangular case member as seen from a plan view and installed horizontally. The second casing member 10 has a large number of heated gas nozzle holes 11 on the side facing the conveyor 4.

In the first casing member 8, the ends of the pair of gas guide sections 8b are connected to both ends of the second casing member 10 by a duct 12.

The first casing member 8 and the second casing member 10 connected by the duct 12 are installed in each of the chambers 1 and 2. In this case, The first casing member 8 is arranged with the gas guide section 8b extending in a direction perpendicular to the transport line of the conveyor 4.

The diameter of the fan 6 is larger than the width along the transport line of the conveyor 4 in each of the chambers 1 and 2.

Multiple heaters 13 are installed in the space between the first casing member 8 and the second casing member 10.

A partition wall 14 separating the chambers 1 and 2 extends vertically in a straight line perpendicular to the transport line of the conveyor 4.

The flow of the heated gas is described next.

The nitrogen gas within the chambers 1 and 2 is drawn into the fan 6 from the intake opening 9 of the first casing member 8 by the fan 6. The nitrogen gas is at this time heated while passing through the heater 13. The heated nitrogen gas is discharged from the discharge opening of the fan 6, and enters the second casing member 10 after passing through the duct 12 and the gas guide section 8b of the first casing member 8, and is blown from the nozzle holes 11 onto the printed circuit board 5 mounted with electronic components on the conveyor 4, and the solder on the printed circuit board is heated. The nitrogen gas then enters a space 19 between the first casing member 8 and the second casing member 10 after passing through a space 18 between the second casing member 10 and its surrounding walls, and is drawn into the fan 6 while being heated by the heater 13 and is discharged to the gas guide section 8b of the first casing member 8.

The printed circuit board 5 mounted with the electronic components is in this way gradually heated in the preheating chamber 1 and the soldering paste melted in the reflow chamber 2. The melted solder on the printed circuit board 5 mounted with the electronic components is then cooled in the cooling chamber 3 and the soldering completed.

The fan 6, the first casing member 8 and the second casing member 10 are also installed in the same way inside the cooling chamber 3.

In this embodiment, the fans 6 are arranged in a inclined position as described above, so that the fans 6 having a larger size or in other words greater power can therefore be installed without increasing the total length of the reflow soldering apparatus. A reflow soldering apparatus with both superior performance and a compact design can therefore be provided.

Figure 23:
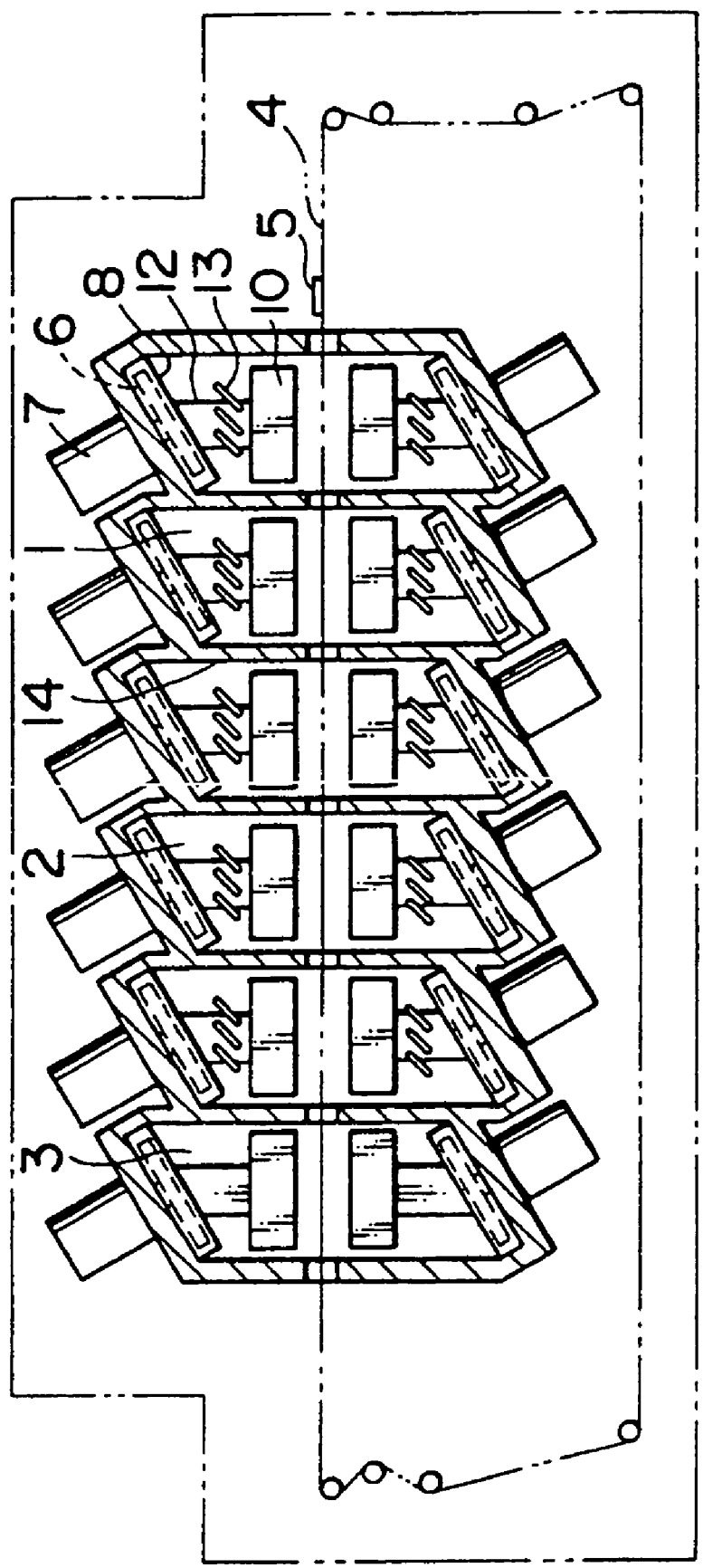
FIG. 23 is a vertical cross sectional view showing still another preferred embodiment of the reflow soldering apparatus of the present invention.

The example in the embodiment shows the rotating shafts 6a of the fans 6 arranged diagonally in different directions. However, as shown in FIG. 23, the rotating shafts 6a of the upper and lower fans 6 may be arranged diagonally in the same direction.

The example in the embodiment shows the rotating shafts of the fans arranged diagonally along the transport line of the conveyor. However, the inclined direction of the rotating shafts of the fans may be tilted in a direction to form an angle with the transport line of the conveyor.

There are no particular restrictions on the inclined angle of the rotating shaft of the fan and the rotating shaft may for example be arranged at 90 degrees or in others words in a horizontal position, etc.

INDUSTRIAL APPLICABILITY

The present invention as described above can provide a reflow soldering apparatus with both superior performance and a compact design, so that the space for installing an apparatus can be made small and the reflow soldering apparatus of the present invention is therefore effective for soldering of the electronic components on the circuit boards.

The invention claimed is:

1. A reflow soldering apparatus comprising a conveyor adapted to travel in a plane along a transport line so as to transport circuit boards mounted with electronic components into multiple chambers contained in the apparatus, blowing means installed in said chambers, each blowing means having a rotating shaft perpendicular with respect to the plane of travel of the conveyor, a first casing member having a fan storage section housing said blowing means and a gas guide section extending from said fan storage section in a direction perpendicular to the transport line of said conveyor, a second casing member connected to said gas guide section of said first casing member and having multiple heated gas nozzle holes on the side facing said conveyor, and a gas circulated by said blowing means and heated while passing through a heater installed within said apparatus and entered said second casing member from said gas guide section of said first casing member to be blown from said nozzle holes onto said circuit boards on said conveyor, wherein said blowing means are arrayed offset to the left and right along a plane that is parallel to the plane of travel of the conveyor such that said blowing means overlap along a line that is perpendicular to the transport line of the conveyor in the plane that is parallel to the plane of travel of the conveyor, and said first casing member and said second casing member have a width smaller than the diameter of said blowing means.

2. A reflow soldering apparatus comprising a conveyor adapted to travel in a plane alone a transport line so as to transport circuit boards mounted with electronic components into multiple chambers contained in the apparatus, blowing means installed in said chambers, each blowing means having a rotating shaft perpendicular with respect to the plane of travel of the conveyor, a first casing member having a fan storage section housing said blowing means and a gas guide section extending from said fan storage section in a direction perpendicular to the transport line of said conveyor, a second casing member connected to said gas guide section of said first casing member and having multiple heated gas nozzle holes on the side facing said conveyor, and a gas circulated by said blowing means and heated while passing through a heater installed within said apparatus and entered said second casing member from said gas guide section of said first casing member to be blown from said nozzle holes onto said circuit boards on said conveyor, wherein said blowing means are arrayed offset up and down along a plane that is parallel to the plane of travel of the conveyor such that said blowing means overlap along a line that is perpendicular to the plane of travel of the conveyor, and said first casing member and said second casing member have a width smaller than the diameter of said blowing means.

3. A reflow soldering apparatus comprising a conveyor adapted to travel in a plane along a transport line so as to transport circuit boards mounted with electronic components into multiple chambers contained in the apparatus, blowing means installed in said chambers, each blowing means having a rotating shaft perpendicular with respect to the plane of travel of the conveyor, a first casing member having a fan storage section housing said blowing means and a gas guide section extending from said fan storage section in a direction perpendicular to the transport line of said conveyor, a second casing member connected to said gas guide section of said first casing member and having multiple heated gas nozzle holes on the side facing said conveyor, and a gas circulated by said blowing means and heated while passing through a heater installed within said apparatus and entered said second casing member from said gas guide section of said first casing member to be blown from said nozzle holes onto said circuit boards on said conveyor, wherein said blowing means are arrayed offset to the left and right along a plane that is parallel to the plane of travel of the conveyor such that said blowing means storage sections of the first casing members overlap along a line that is perpendicular to the transport line of the conveyor in the plane that is parallel to the plane of travel of the conveyor, and said first casing member and said second casing member have a width smaller than the diameter of said blowing means.

4. A reflow soldering apparatus comprising a conveyor adapted to travel in a plane alone a transport line so as to transport circuit boards mounted with electronic components into multiple chambers contained in the apparatus, blowing means installed in said chambers, each blowing means having a rotating shaft perpendicular with respect to the plane of travel of the conveyor, a first casing member having a fan storage section housing said blowing means and a gas guide section extending from said fan storage section in a direction perpendicular to the transport line of said conveyor, a second casing member connected to said gas guide section of said first casing member and having multiple heated gas nozzle holes on the side facing said conveyor, and a gas circulated by said blowing means and heated while passing through a heater installed within said apparatus and entered said second casing member from said gas guide section of said first casing member to be blown from said nozzle holes onto said circuit boards on said conveyor, wherein said blowing means are arrayed offset up and down along a plane that is parallel to the plane of travel of the conveyor such that said blowing means storage sections of the first casing members overlap alone a line that is perpendicular to the plane of travel of the conveyor, and said first casing member and said second casing member have a width smaller than the diameter of said blowing means.

* * * * *

UNITED STATES PATENT AND TRADEMARK OFFICE
CERTIFICATE OF CORRECTION

PATENT NO. : 7,690,550 B2
APPLICATION NO. : 10/511450
DATED : April 6, 2010
INVENTOR(S) : Yatsuharu Yokota It is certified that error appears in the above-identified patent and that said Letters Patent is hereby corrected as shown below:

In column 11, line 44, "alone" should be --along--

In column 12, line 35, "alone" should be --along--

In column 12, line 54, "alone" should be --along--

Signed and Sealed this

First Day of June, 2010

David J. Kappos
*Director of the United States Patent and Trademark Office*